US012430874B2

United States Patent
Yumine et al.

(10) Patent No.: US 12,430,874 B2
(45) Date of Patent: Sep. 30, 2025

(54) DETECTION SYSTEM AND DETECTION METHOD

(71) Applicant: Panasonic Intellectual Property Management Co., Ltd., Osaka (JP)

(72) Inventors: Manabu Yumine, Osaka (JP); Shoji So, Osaka (JP); Shigeru Furumiya, Osaka (JP); Michihiro Yamagata, Osaka (JP); Yutaka Sonoda, Tokyo (JP); Hiroshi Iwai, Osaka (JP); Tomokuni Iijima, Osaka (JP); Yoshimitsu Noguchi, Osaka (JP); Makoto Yarino, Kyoto (JP); Yusuke Nihei, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 252 days.

(21) Appl. No.: 18/323,140

(22) Filed: May 24, 2023

(65) Prior Publication Data

US 2023/0401816 A1    Dec. 14, 2023

(30) Foreign Application Priority Data

Jun. 8, 2022   (JP) ................. 2022-092962

(51) Int. Cl.
| | |
|---|---|
| G06V 10/56 | (2022.01) |
| G06T 7/11 | (2017.01) |
| G06T 7/174 | (2017.01) |
| G06T 7/187 | (2017.01) |
| G06T 7/90 | (2017.01) |
| G06V 10/60 | (2022.01) |

(Continued)

(52) U.S. Cl.
CPC ............. *G06V 10/56* (2022.01); *G06T 7/11* (2017.01); *G06T 7/174* (2017.01); *G06T 7/187* (2017.01);

(Continued)

(58) Field of Classification Search
CPC . G06T 2207/10024; G06T 7/11; G06T 7/174; G06T 7/187; G06T 7/90;

(Continued)

(56) References Cited

U.S. PATENT DOCUMENTS 11,978,181 B1 *  5/2024  Pieper ................. H04N 23/617
2016/0094796 A1   3/2016  Govil (Continued)

FOREIGN PATENT DOCUMENTS

| JP | 2017535999 A | 11/2017 |
|---|---|---|
| JP | 2020161992 A | 10/2020 |

(Continued)

OTHER PUBLICATIONS

Japanese Notice of Reasons for Refusal dated Mar. 26, 2024, for the corresponding Japanese Patent Application No. 2022-092962, 9 pages. (With English Machine Translation).

*Primary Examiner* — Amy R Hsu
(74) *Attorney, Agent, or Firm* — Seed Intellectual Property Law Group LLP

(57) ABSTRACT

A detection system includes: an obtainer that obtains image data generated based on an amount of light received by each of a plurality of pixels from a detection target and event data generated based on a change in an amount of light received by each of a plurality of pixels from the detection target; a processor that extracts, from the event data as auxiliary information, information to be used to assist in detecting the detection target from the image data; and a detector that detects the detection target or a state of the detection target based on at least the image data and the auxiliary information.

18 Claims, 22 Drawing Sheets

(51) Int. Cl.
  *G06V 20/58* (2022.01)
  *H04N 23/84* (2023.01)
(52) U.S. Cl.
  CPC ............... *G06T 7/90* (2017.01); *G06V 10/60* (2022.01); *G06V 20/584* (2022.01); *G06T 2207/10024* (2013.01); *G06V 2201/07* (2022.01); *H04N 23/84* (2023.01)
(58) Field of Classification Search
  CPC ...... G06V 10/56; G06V 10/60; G06V 20/584; G06V 2201/07; H04N 23/84
  See application file for complete search history.

(56) References Cited

U.S. PATENT DOCUMENTS

| | | | |
|---|---|---|---|
| 2017/0154412 A1* | 6/2017 | Tatsumi | ................ H04N 23/63 |
| 2019/0303733 A1* | 10/2019 | Kozuka | ................ H04N 1/6058 |
| 2021/0158574 A1* | 5/2021 | Suwa | .................... G01J 3/0264 |
| 2022/0166958 A1* | 5/2022 | Hoshino | ................ H04N 23/60 |
| 2022/0172486 A1 | 6/2022 | Nakagawa et al. | |
| 2022/0242317 A1* | 8/2022 | Nakagawa | ............. H04N 25/50 |
| 2023/0009479 A1* | 1/2023 | Suzuki | ................... G06V 10/26 |
| 2023/0353893 A1 | 11/2023 | Niikura et al. | |
| 2024/0005547 A1* | 1/2024 | Lin | ........................... G06T 7/70 |
| 2025/0020481 A1* | 1/2025 | Xie | .................... G01C 21/3837 |

FOREIGN PATENT DOCUMENTS

| | | | |
|---|---|---|---|
| JP | 2022054057 A | 4/2022 | |
| WO | WO 2016053795 A1 | 4/2016 | |
| WO | WO 2020195769 A1 | 10/2020 | |
| WO | WO 2020246186 A1 | 12/2020 | |

\* cited by examiner

DETECTION SYSTEM AND DETECTION METHOD

CROSS REFERENCE TO RELATED APPLICATION

The present application is based on and claims priority of Japanese Patent Application No. 2022-092962 filed on Jun. 8, 2022.

FIELD

The present disclosure relates to systems, etc., that detect an imaged detection target.

BACKGROUND

Conventionally, systems each including an event detection device and an imaging device have been proposed (for example, refer to Patent Literature (PTL) 1). In the event detection device, each of a plurality of pixels detects, as an event, that the amount of change in light received by the pixel has exceeded a predetermined threshold value. Using this event and an image captured by the imaging device, the system detects a state of a detection target. For example, the state of a road surface is detected as the state of the detection target.

CITATION LIST

Patent Literature

PTL 1: Japanese Unexamined Patent Application Publication No. 2020-161992

SUMMARY

However, the system disclosed in PTL 1 can be improved upon.

In view of this, the present disclosure provides a detection system capable of improving upon the above related art.

A detection system according to one aspect of the present disclosure includes: an obtainer that obtains image data and event data, the image data being generated based on an amount of light received by each of a plurality of pixels from a detection target, the event data being generated based on a change in an amount of light received by each of a plurality of pixels from the detection target; a processor that extracts, from the event data as auxiliary information, information to be used to assist in detecting the detection target from the image data; and a detector that detects the detection target or a state of the detection target based on at least the image data and the auxiliary information.

Note that these general and specific aspects may be implemented using a device, a method, an integrated circuit, a computer program, or a computer-readable recording medium such as a compact disc read-only memory (CD-ROM), or any combination of devices, methods, integrated circuits, computer programs, and recording media. The recording medium may be a non-transitory recording medium.

A detection system according to one aspect of the present disclosure is capable of improving upon the above related art.

Additional benefits and advantages according to one aspect of the present disclosure will become apparent from the specification and the drawings. The benefits and/or advantages may be individually provided by the various embodiments and features disclosed in the specification and the drawings, which need not all be provided.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
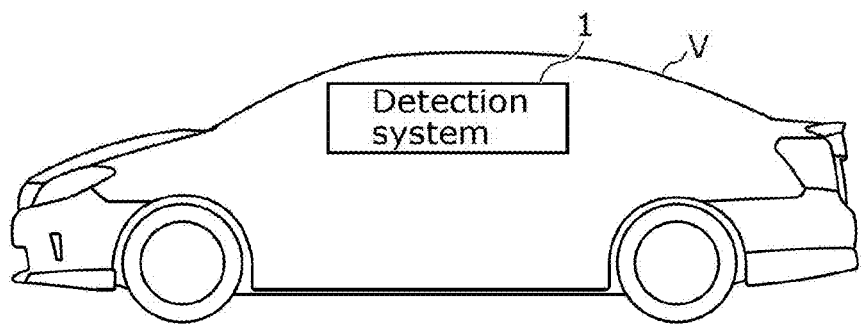
FIG. 1 is a diagram illustrating one example of a vehicle on which a detection system according to Embodiment 1 is installed.

DESCRIPTION OF EMBODIMENTS (Underlying Knowledge Forming Basis of the Present Disclosure)

With the system disclosed in PTL 1, there are case where an event detection device outputs an enormous amount of event data. Direct use of such event data in detecting a detection target or a state of the detection target leads to the problem that the processing load in the detection increases. Thus, the present disclosure provides a detection system, etc., capable of reducing the processing load in detecting a detection target or a state of the detection target.

Specifically, the inventors found that the following problems occur regarding the system disclosed in PTL 1 that has been described in the "Background" section.

The system disclosed in PTL 1 includes the event detection device and the imaging device as mentioned above. In image data obtained through imaging by the imaging device, a subject appears as a detection target. Therefore, using this image data, the detection target appearing in the image data and the state of the detection target can be detected. However, there are cases where a detection target or a state of the detection target does not appear clearly in the image data. For example, when a phenomenon that is blown-out highlights or crushed shadows occurs, a detection target does not appear clearly in a region in a frame included in the image data where said phenomenon occurs. Note that crushed shadows are also referred to as blocked-up shadows. Such a phenomenon may occur, for example, when the imaging device is installed on a vehicle and the vehicle travels at the entrance or exit of a tunnel. This means that the aforementioned phenomenon may occur because the exposure adjustment operation by the automatic exposure adjustment function of the imaging device is not fast enough for an abrupt change in the brightness of the surroundings. Furthermore, when the imaging device receives light from headlights of an oncoming vehicle at night, a large dynamic range is required. Even in such a case, the phenomenon that is blown-out highlights or crushed shadows may occur. When such a phenomenon that is blown-out highlights or crushed shadows occurs, it is not possible to properly detect a detection target or a state of the detection target.

A lamp of a traffic light flashes fast to inform a person that the lamp is ON. For example, the red lamp flashes fast to inform a person that the red lamp is ON, in other words, the red light is displayed. Specifically, the red lamp flashes at a frequency of 100 Hz with a duty ratio of 50%. The ON time and the OFF time of the red lamp in this case are five milliseconds each. Therefore, when the exposure period of the imaging device is less than five milliseconds, the exposure of the imaging device may be performed at the timing at which the red lamp is OFF even while the red lamp flashes fast to display the red light. In this case, the red lamp that is OFF appears in the image data, meaning that with the image data alone, it is erroneously detected that the red light is not displayed. Therefore, by imposing a constraint that the exposure period of the imaging device be set to at least 10 milliseconds, for example, it is possible to minimize such erroneous detection. This means that in order to obtain image data in which the red lamp that is ON appears, it is necessary to set a lower limit on the exposure period of the imaging device. However, because the exposure period cannot be set shorter than the lower limit, a bright scene captured against the Sun, for example, may be prone to blown-out highlights, which is another problem.

In view of this, there is a possibility that even when the phenomenon that is blown-out highlights or crushed shadows occurs, a detection target or a state of the detection target can be properly detected using event data indicating an event detected by the event detection device. In other words, it is possible to detect a detection target or a state of the detection target by performing a recognition process for image data and a recognition process for event data.

However, when the event detection device is installed on a vehicle or the like, for example, the sensing region of the event detection device largely depends on the travel of the vehicle. Note that the sensing region corresponds to the imaging range of the imaging device. For example, when the vehicle turns right or left, the overall sensing region changes just like panning of the imaging device. As a result, many events are generated, and thus the event detection device outputs a larger amount of event data than the amount of image data from the imaging device. Thus, the event data requires a data transfer rate higher than the data transfer rate for the image data. Furthermore, since the event data needs to be transmitted to devices such as electronic control units (ECUs) that detect a detection target, the amount of data to be transferred is enormous. Moreover, when the recognition process is performed on such event data in addition to the image data, an enormous processing load is imposed. The detection system according to the present disclosure can reduce the processing load.

In the recognition process for event data, the image recognition process technique cannot be used. For example, an existing convolutional neural network (CNN) for image recognition cannot be used in the recognition process for event data. Furthermore, in the case where a machine-learning recognition process using the CNN or the like is performed on the event data, training images accumulated in the past cannot be used. Therefore, in the case where the event data is directly used to detect a detection target, a new recognition process technique needs to be developed, and a large amount of new event data for training or verification needs to be prepared.

Thus, a detection system according to the first aspect of the present disclosure includes: an obtainer that obtains image data and event data, the image data being generated based on an amount of light received by each of a plurality of pixels from a detection target, the event data being generated based on a change in an amount of light received by each of a plurality of pixels from the detection target; a processor that extracts, from the event data as auxiliary information, information to be used to assist in detecting the detection target from the image data; and a detector that detects the detection target or a state of the detection target based on at least the image data and the auxiliary information. For example, the event data is data generated by an event sensor including a plurality of event pixels and indicates which position in a spatial sensing region of the event sensor and at which time an event that is a change of at least a threshold value in the amount of light reception has occurred.

With this, auxiliary information that is a temporal or spatial information portion of the event data is extracted from the event data, and a detection target or a state of the detection target is detected from the image data using the auxiliary information. Therefore, the detector does not need to use the entire event data, meaning that the amount of data required by the detector in the detection can be reduced and as a result, the processing load in the detection can be reduced.

Furthermore, in the second aspect dependent from the first aspect, the processor may include: a black-white detector that detects, as a first processing target region, a region in the image data in which a phenomenon that is a blown-out highlight or a crushed shadow has occurred; and an image combiner that generates a composite image by extracting, from the event data as the auxiliary information, information indicating an event that has occurred at a position corresponding to the first processing target region at a time of occurrence of the phenomenon, and combining the first processing target region in the image data with an event image representing the event. The detector may detect the detection target or the state of the detection target based on the composite image.

Thus, information included in the event data and indicating an event that has occurred at a position corresponding to the first processing target region is extracted as the auxiliary information. For example, when the event data indicates one or more events that have occurred in the entire range of the sensing region of the event sensor, only information indicating, among the one or more events, an event that has occurred at a position corresponding to the first processing target region is extracted as the auxiliary information. Subsequently, the first processing target region in the image data is combined with an event image representing the event indicated in the auxiliary information such as the outline of the detection target, for example. Thus, the detector can easily detect the contour, etc., of the detection target that is located in the first processing target region. Specifically, even when the detection target is hard to see in each of a blown-out highlight region in which a phenomenon that is blown-out highlights has occurred and a crushed shadow region in which a phenomenon that is crushed shadows has occurred in the image data, the outline, etc., of the detection target is superimposed on the image data as the event image. As a result, the detection target can be easily detected.

Furthermore, in the third aspect dependent from the second aspect, when the blown-out highlight occurs as the phenomenon, the image combiner may combine the first processing target region with the event image of a color different from a color of an image in the first processing target region or the event image at a luminance level lower than a luminance level of the image in the first processing target region, and when the crushed shadow occurs as the phenomenon, the image combiner may combine the first processing target region with the event image of a color different from a color of an image in the first processing target region or the event image at a luminance level higher than a luminance level of the image in the first processing target region.

With this, in each of the blown-out highlight region and the crushed shadow region, the event image such as an outline that can be easily identified from the image in that region is superimposed, and thus the detector can more easily detect the detection target.

Furthermore, in the fourth aspect dependent from the second aspect, when the image data is generated by global shutter imaging and includes a frame including the first processing target region, the image combiner may determine the time of the occurrence of the phenomenon according to a timing at which the frame is generated.

Thus, the time at which the phenomenon that is blown-out highlights or crushed shadows has occurred is determined according to the timing at which the frame including the first processing target region is generated, and the auxiliary information indicating an event that has occurred at said time is extracted. As a result, when two or more frames each including the first processing target region are generated, the time at which the aforementioned phenomenon has occurred is determined for each frame according to the timing at which the frame is generated, and the auxiliary information indicating an event that has occurred at said time is extracted. Therefore, the event indicated in the auxiliary information extracted and the first processing target region can be temporally associated in an appropriate manner, and a detection target or a state of the detection target can be detected with improved accuracy.

Furthermore, in the fifth aspect dependent from the second aspect, when the image data is generated by rolling shutter imaging and includes a frame including the first processing target region, the image combiner may determine the time of the occurrence of the phenomenon according to a timing at which, among a plurality of lines included in the frame, a line including at least a portion of the first processing target region is generated.

Thus, the time at which the phenomenon that is blown-out highlights or crushed shadows has occurred is determined according to the timing at which a line including at least a portion of the first processing target region is generated, and the auxiliary information indicating an event that has occurred at said time is extracted. As a result, when two or more lines each including a portion of the first processing target region are generated, the time at which the aforementioned phenomenon has occurred is determined for each line according to the timing at which the line is generated, and the auxiliary information indicating an event that has occurred at said time is extracted. Therefore, the event indicated in the auxiliary information extracted and at least a portion of the first processing target region can be temporally associated in an appropriate manner, and a detection target or a state of the detection target can be detected with improved accuracy.

Furthermore, in the sixth aspect dependent from the first aspect, the processor may include: a flashing detector that detects, from the event data, a region in which a plus event and a minus event have repeatedly occurred at a frequency greater than or equal to a threshold value, and extracts, as the auxiliary information, information indicating that the region is flashing; and an image combiner that generates a composite image by combining a second processing target region in the image data with an ON image indicating that the detection target is flashing, the second processing target region corresponding to the region indicated in the auxiliary information. The detector may detect the detection target or the state of the detection target based on the composite image. Note that the plus event is an event indicating that the amount of light reception increases by at least a threshold value, and the minus event is an event indicating that the amount of light reception decreases by at least a threshold value. The frequency greater than or equal to the threshold value is a frequency of flashing of an object at which when a person looks at the flashing object, the object appears lit up, for example.

For example, the red lamp of a traffic light displays the red light by flashing at a high frequency. Such a red lamp that displays the red light appears to be not flashing, but be constantly ON to human eyes. Meanwhile, when an image sensor having an exposure period set short in order to avoid the aforementioned phenomenon that is blown-out highlights captures an image of the red lamp that displays the red light as the detection target, for example, the image sensor may output image data including a frame in which the red lamp that is OFF appears. Therefore, with the image data alone, it may be erroneously determined that the red light is not displayed. However, with the detection system according to the sixth aspect, in this case, the auxiliary information indicating that a plus event and a minus event have repeatedly occurred in a region corresponding to the second processing target region in which the red lamp appears is extracted. Subsequently, the second processing target region is combined with an ON image. Therefore, even when the red lamp that is OFF appears as the detection target in the second processing target region in a frame included in the image data, the second processing target region is combined with an ON image; thus, the detector can properly detect that the red light is displayed. This means that erroneous detection of the detection target can be minimized. Note that the detection target is the red lamp of a traffic light in this example, but when the detection target is a brake lamp of a vehicle, it is possible to produce advantageous effects that are substantially the same as those produced in this example.

Furthermore, in the seventh aspect dependent from the first aspect, the processor may include a flashing detector that detects, from the event data, a region in which a plus event and a minus event have repeatedly occurred at a frequency greater than or equal to a threshold value, and extracts, as the auxiliary information, information indicating that the region is flashing. The detector may determine that a second processing target region in the image data is flashing, and detect the detection target or the state of the detection target based on a result of the determination and the image data, the second processing target region corresponding to the region indicated in the auxiliary information.

With this, even when the image data is not combined with the ON image, erroneous detection of the detection target such as the red lamp, for example, can be minimized, as in the above-described case, on the basis of the auxiliary information and the image data.

Furthermore, in the eighth aspect dependent from the first aspect, the processor may include: a black-white detector that detects, as a first processing target region, a region in the image data in which a phenomenon that is a blown-out highlight or a crushed shadow has occurred; a flashing detector that detects, from the event data, a region in which a plus event and a minus event have repeatedly occurred at a frequency greater than or equal to a threshold value, and extracts, as first auxiliary information included in the auxiliary information, information indicating that the region is flashing; and an image combiner that generates a composite image by (a) extracting, from the event data as second auxiliary information included in the auxiliary information, information indicating an event that has occurred at a position corresponding to the first processing target region at a time of occurrence of the phenomenon, and combining the first processing target region in the image data with an event image representing the event and (b) combining a second processing target region in the image data with an ON image indicating that the detection target is flashing, the second processing target region corresponding to the region indicated in the first auxiliary information. The detector may detect the detection target or the state of the detection target based on the composite image.

With this, even when the detection target is hard to see in each of the blown-out highlight region and the crushed shadow region in the image data, the outline, etc., of the detection target is superimposed on the image data as the event image. As a result, the detection target can be easily detected. Furthermore, even when a flashing red lamp as the detection target appears as a red lamp that is OFF in the second processing target region in the image data, the second processing target region is combined with the ON image. Therefore, the detector can correctly detect that the red light is displayed. This means that erroneous detection of the detection target can be minimized.

Furthermore, in the ninth aspect dependent from the first aspect, the processor may include: a black-white detector that detects, as a first processing target region, a region in the image data in which a phenomenon that is a blown-out highlight or a crushed shadow has occurred; a flashing detector that detects, from the event data, a region in which a plus event and a minus event have repeatedly occurred at a frequency greater than or equal to a threshold value, and extracts, as first auxiliary information included in the auxiliary information, information indicating that the region is flashing; and an image combiner that generates a composite image by extracting, from the event data as second auxiliary information included in the auxiliary information, information indicating an event that has occurred at a position corresponding to the first processing target region at a time of occurrence of the phenomenon, and combining the first processing target region in the image data with an event image representing the event. The detector may determine that a second processing target region in the image data is flashing, and detect the detection target or the state of the detection target based on a result of the determination and the composite image, the second processing target region corresponding to the region indicated in the first auxiliary information.

With this, even when the image data is not combined with the ON image, erroneous detection of the detection target such as the red lamp, for example, can be minimized, as in the above-described case, on the basis of the first auxiliary information and the image data.

Furthermore, in the tenth aspect dependent from the first aspect, the detection system may further include: a frame-forming unit that converts the event data obtained, into event data in a form of a frame that represents an image without including coordinate data. The detector may detect the detection target or the state of the detection target based on the image data, the auxiliary information, and the event data in the form of the frame.

With this, the event data is converted into the event data in the form of frames, and thus the amount of data to be used to detect the detection target can be significantly reduced.

Furthermore, in the eleventh aspect dependent from the tenth aspect, the processor may include a flashing detector that detects, from the event data, a region in which a plus event and a minus event have repeatedly occurred at a frequency greater than or equal to a threshold value, and extracts, as the auxiliary information, information indicating that the region is flashing. The frame-forming unit may add the auxiliary information to the event data in the form of the frame and output the event data in the form of the frame.

With this, even when high-frequency flashing of the detection target is difficult to detect with the event data in the form of frames alone, the event data in the form of frames has added thereto the auxiliary information indicating this flashing. Therefore, by using the auxiliary information, it is possible to properly detect that the detection target is flashing, for example, that the red light is displayed when the detection target is the red lamp of a traffic light.

Furthermore, in the twelfth aspect dependent from the tenth or eleventh aspect, the frame-forming unit may convert the event data so as to synchronize the event data in the form of the frame with the image data.

With this, it is possible to clarify the correspondence relationship between the event data in the form of frames and a frame included in the event data. As a result, the detection target appearing in a frame can be properly detected on the basis of the event indicated in the event data in the form of frames that corresponds to the frame.

Furthermore, in the thirteenth aspect dependent from the first aspect, the detection system may further include: a sensor in which a plurality of first pixels for generating the image data and a plurality of second pixels for generating the event data are arranged.

Thus, one sensor includes: an image sensor that generates the image data; and an event sensor that generates the event data. As a result, the correspondence relationship between the plurality of first pixels of the image sensor and the plurality of second pixels of the event sensor can be fixed in advance. Therefore, positioning for specifying the correspondence relationship can be omitted. In other words, it is possible to easily and accurately specify which region in the sensing region of the event sensor each region in a frame of the image data corresponds to. Thus, the detection target can be more accurately detected from the image data.

Furthermore, in the fourteenth aspect dependent from the thirteenth aspect, the plurality of first pixels may include a plurality of types of pixels that are sensitive to light of different colors, and each of the plurality of second pixels may be sensitive to clear light. Examples of the different colors include red, green, and blue. The clear light can also be said as white light.

With this, the image data of an appropriate color can be obtained. Furthermore, since each of the plurality of second pixels is sensitive to clear light, it is possible to obtain event data having a wide dynamic range. As a result, a detection target or a state of the detection target can be detected with high accuracy.

Furthermore, in the fifteenth aspect dependent from the thirteenth aspect, the plurality of first pixels may include a plurality of types of pixels that are sensitive to light of different colors, and each of the plurality of second pixels may be sensitive to red light.

With this, the event data is generated on the basis of a change in the amount of red light received; thus, it is possible to properly detect an event that occurs on a detection target such as the red lamp of a traffic light and a brake lamp of a vehicle, for example, and the state of the detection target can be detected with high accuracy.

Furthermore, in the sixteenth aspect dependent from the thirteenth aspect, the plurality of first pixels may include a pixel that is sensitive to red light and a pixel that is sensitive to light of a color other than red, and the plurality of second pixels may include a pixel that is sensitive to red light and a pixel that is sensitive to clear light.

With this, event data having a wide dynamic range can be obtained and furthermore, it is possible to properly detect an event that occurs on a detection target such as the red lamp of a traffic light and a brake lamp of a vehicle. As a result, a detection target such as the red lamp or a state of the detection target can be detected with high accuracy.

Furthermore, in the seventeenth aspect dependent from the thirteenth aspect, the plurality of first pixels may include a pixel that is sensitive to red light, a pixel that is sensitive to yellow light, and a pixel that is sensitive to light of a color other than red and yellow, and the plurality of second pixels may include a pixel that is sensitive to red light, a pixel that is sensitive to yellow light, and a pixel that is sensitive to clear light.

With this, event data having a wide dynamic range can be obtained. Furthermore, since the plurality of second pixels include a pixel that is sensitive to red light, it is possible to properly detect an event that occurs on a detection target such as the red lamp of a traffic light and a brake lamp of a vehicle. Furthermore, since the plurality of second pixels include a pixel that is sensitive to yellow light, it is possible to properly detect an event that occurs on a detection target such as the yellow lamp of a traffic light. As a result, a detection target such as the red lamp and the yellow lamp or a state of the detection target can be detected with high accuracy.

Furthermore, in the eighteenth aspect dependent from the thirteenth aspect, the plurality of second pixels may be fewer than the plurality of first pixels.

Thus, in the sensor, the plurality of second pixels are arranged more sparsely than the plurality of first pixels. Therefore, when there is a need for high-resolution image data to detect a detection target, the number of second pixels can be reduced to prevent an excessive increase in the definition of the sensor.

Furthermore, in the nineteenth aspect dependent from one of the thirteenth to eighteenth aspects, the plurality of first pixels may include a plurality of types of pixels each having a different dynamic range.

With this, it is possible to obtain high dynamic range (HDR) image data, and a detection target or a state of the detection target can be detected with improved accuracy.

Note that any aspects among the first to nineteenth aspects described above may be combined. For example, any one aspect among the thirteenth to nineteenth aspects may be combined with any one aspect among the first to twelfth aspects. The second aspect and the tenth aspect may be combined and may be further combined with the thirteenth aspect. The sixth aspect and the twelfth aspect may be combined and may be further combined with the thirteenth aspect. The seventh aspect and the twelfth aspect may be combined and may be further combined with the thirteenth aspect. The eighth aspect and the twelfth aspect may be combined and may be further combined with the thirteenth aspect. The ninth aspect and the twelfth aspect may be combined and may be further combined with the thirteenth aspect.

Hereinafter, embodiments will be specifically described with reference to the drawings.

Note that each of the embodiments described below shows a general or specific example. The numerical values, shapes, materials, structural elements, the arrangement and connection of the structural elements, steps, the processing order of the steps, etc., shown in the following embodiments are mere examples, and therefore do not limit the present disclosure. Among the structural elements in the following embodiments, structural elements not recited in any one of the independent claims which indicate the broadest concepts will be described as optional structural elements.

Note that the figures are schematic diagrams and are not necessarily precise illustrations. In addition, in the figures, identical structural components are given the same reference signs.

Embodiment 1

FIG. 1 is a diagram illustrating one example of a vehicle on which a detection system according to the present embodiment is installed.

Detection system 1 according to the present embodiment is installed on vehicle V, as illustrated in FIG. 1, for example. Detection system 1 captures an image of a detection target present in the surroundings of vehicle V as a subject and further senses a change in the amount of light received from the surroundings. Subsequently, detection system 1 detects the detection target on the basis of the image-capture result and the sensing result. Alternatively, detection system 1 detects a state of the detection target. For example, the detection target may be a person who is present in front of vehicle V or may be a traffic light. When the detection target is a traffic light, detection system 1 detects, as the state of the detection target, whether the red light is displayed on the traffic light. Note that in the present disclosure, detecting a detection target may mean detecting a state of the detection target or may mean detecting each of a detection target and a state of the detection target.

Figure 2:
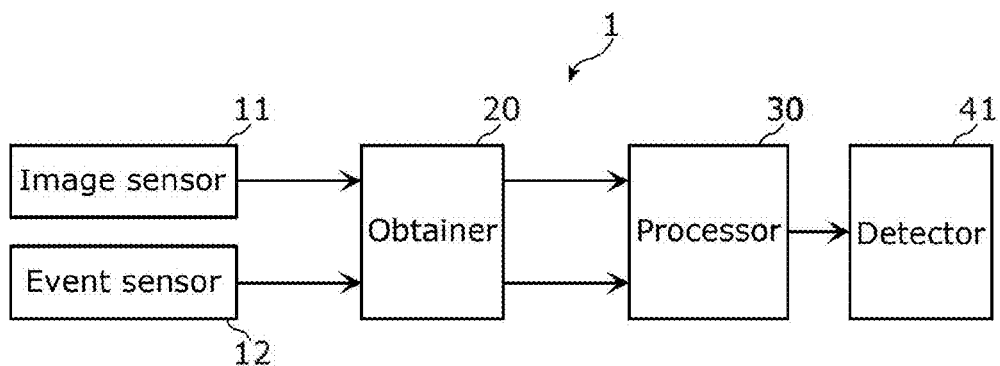
FIG. 2 is a block diagram illustrating one example of the basic configuration of a detection system according to Embodiment 1.

FIG. 2 is a block diagram illustrating one example of the basic configuration of detection system 1 according to the present embodiment.

Detection system 1 includes image sensor 11, event sensor 12, obtainer 20, processor 30, and detector 41. Image sensor 11 is what is called a camera, includes a plurality of imaging pixels, and generates image data by capturing an image of a subject. This means that the image data is data generated on the basis of the amount of light received by each of the plurality of imaging pixels from a detection target, which is a subject, by exposure of the plurality of imaging pixels. For example, image sensor 11 captures images at a predetermined frame rate, thereby sequentially generates and outputs a plurality of images (in other words, frames), and thus outputs image data made up of the plurality of frames.

Event sensor 12, which is also referred to as an event camera or an event-driven camera, senses a change in the amount of light received from the surroundings as mentioned above. Specifically, event sensor 12 includes a plurality of event pixels and generates event data on the basis of a change in the amount of light from the aforementioned detection target that has been received by each of the plurality of event pixels. Such event data indicates, for example, coordinate data indicating a position in a sensing region at which an event has occurred, the polarity of the event, and the time at which the event has occurred. The sensing region is a spatial region in which event sensor 12 can detect an event. The event is classified as an event having an amount of change in light greater than a threshold value (hereinafter also referred to as a plus event) or an event having an amount of change in light less than a threshold value (hereinafter also referred to as a minus event). The polarity of an event indicates whether the event that has occurred is a plus event or a minus event. Note that the absolute value of the threshold value for plus events and the absolute value of the threshold value for minus events may be the same or different. Note that the time in the present disclosure is not limited to an absolute time and may be a relative time.

Obtainer 20 obtains the image data and the event data from image sensor 11 and event sensor 12. Processor 30 extracts, as auxiliary information, information to be used to assist in detecting a detection target from the image data. Detector 41 detects the aforementioned detection target or the state of the detection target on the basis of at least the image data and the auxiliary information.

As just described, detection system 1 according to the present embodiment does not include a unit that detects a detection target directly from the event data. Processor 30 extracts the auxiliary information from the event data, and the auxiliary information is used to detect a detection target from the image data. Therefore, there is no need to include a unit that detects a detection target from the image data and a unit that detects a detection target from the event data; the detection from these data can be unified or integrated. Furthermore, in detection system 1 according to the present embodiment, the auxiliary information that is a temporal or spatial information portion of the event data is extracted from the event data, and a detection target or a state of the detection target is detected from the image data using the auxiliary information. Therefore, detector 41 does not need to use the entire event data, meaning that the amount of data required by detector 41 in the detection can be reduced and as a result, the processing load in the detection can be reduced.

Figure 3:
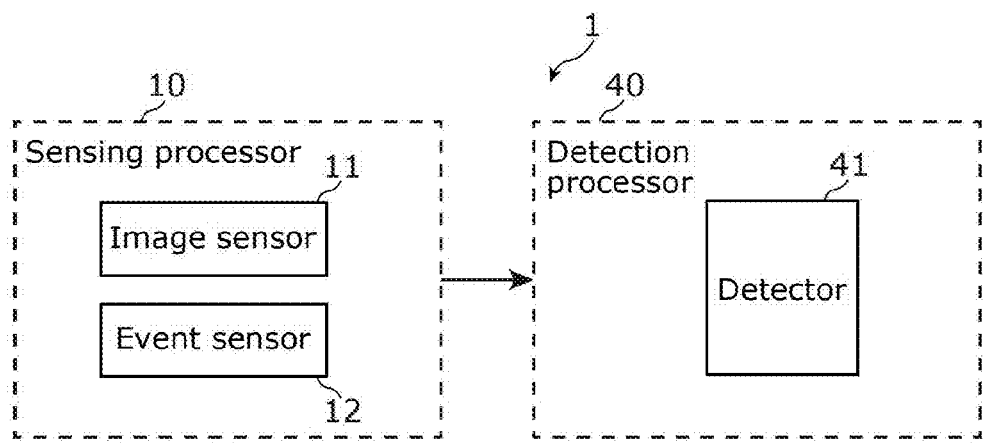
FIG. 3 is a diagram illustrating one example of the outline configuration of a detection system according to Embodiment 1.

FIG. 3 is a diagram illustrating one example of the outline configuration of detection system 1 according to the present embodiment.

It can be said that detection system 1 illustrated in FIG. 2 includes sensing processor 10 and detection processor 40, as illustrated in FIG. 3. Sensing processor 10 includes at least image sensor 11 and event sensor 12. Furthermore, sensing processor 10 may include a structural element other than image sensor 11 and event sensor 12. Detection processor 40 includes at least detector 41. Furthermore, detection processor 40 may include a structural element other than detector

41. For example, some or all of the functions of obtainer 20 illustrated in FIG. 2 may be included in sensing processor 10 or may be included in detection processor 40. Some or all of the functions of processor 30 illustrated in FIG. 2 may be included in sensing processor 10 or may be included in detection processor 40.

Figure 4:
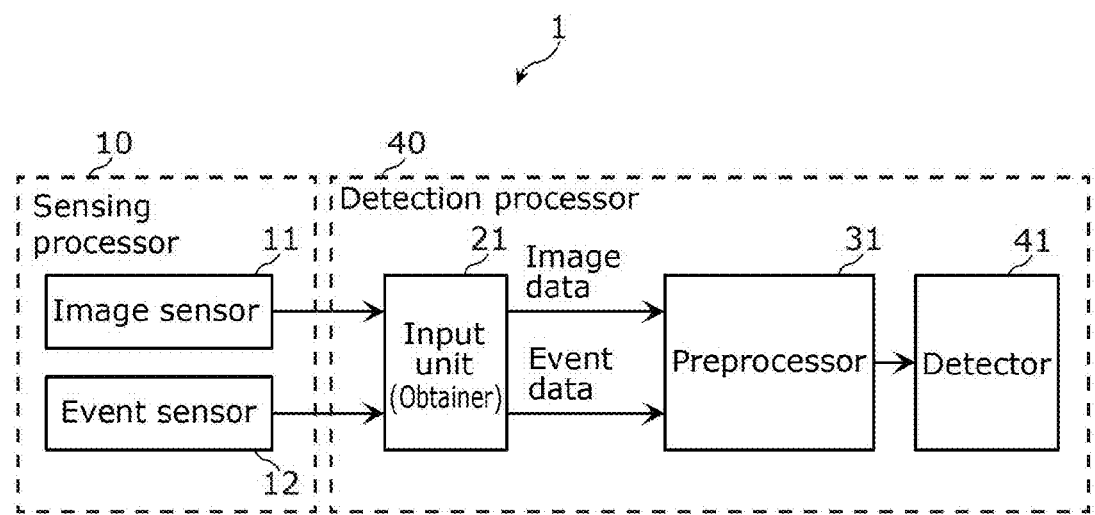
FIG. 4 is a block diagram illustrating one example of the specific configuration of a detection system according to Embodiment 1.

FIG. 4 is a block diagram illustrating one example of the specific configuration of detection system 1 according to the present embodiment.

In the present embodiment, sensing processor 10 of detection system 1 includes image sensor 11 and event sensor 12. Detection processor 40 includes: input unit 21 corresponding to obtainer 20 mentioned above; preprocessor 31 corresponding to processor 30 mentioned above; and detector 41. Input unit 21 obtains the image data from image sensor 11 and obtains the event data from event sensor 12.

Figure 5:
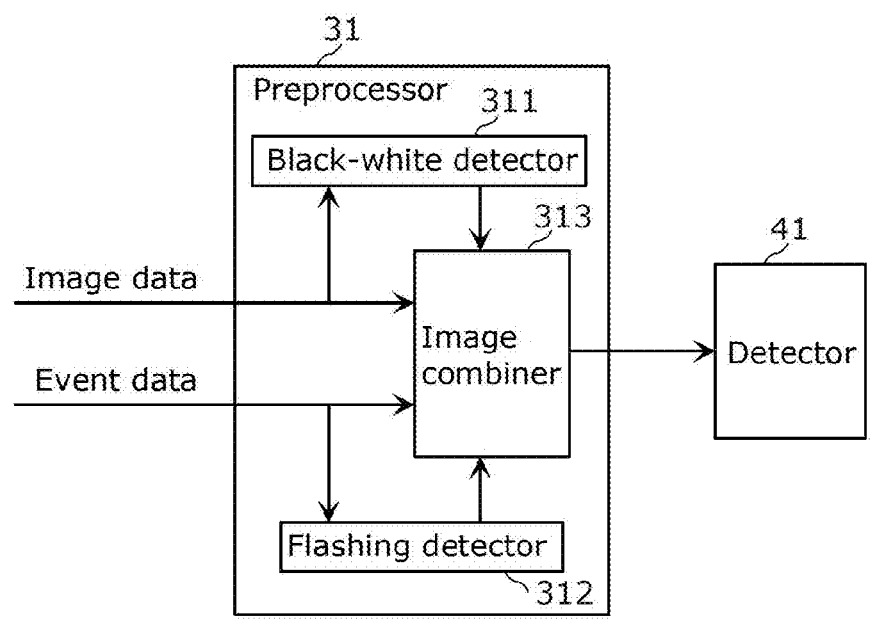
FIG. 5 is a block diagram illustrating one example of the configuration of a preprocessor according to Embodiment 1.

FIG. 5 is a block diagram illustrating one example of the configuration of preprocessor 31.

Preprocessor 31 includes black-white detector 311, flashing detector 312, and image combiner 313.

Black-white detector 311 obtains the image data output from image sensor 11 and detects at least one of a blown-out highlight region and a crushed shadow region from the image data. Subsequently, black-white detector 311 outputs information indicating at least one of the detected blown-out highlight region and the detected crushed shadow region to image combiner 313 as black-white region information.

The blown-out highlight region is a region in a frame of the image data in which a phenomenon that is blown-out highlights has occurred. The crushed shadow region is a region in a frame of the image data in which a phenomenon that is crushed shadows has occurred. Note that the crushed shadows are also referred to as blocked-up shadows and the crushed shadow region is also referred to as a blocked-up shadow region. For example, black-white detector 311 detects, as the blown-out highlight region, a region in a frame in which only pixels having luminance of at least a first threshold value are arranged and detects, as the crushed shadow region, a region in a frame in which only pixels having luminance of at most a second threshold value are arranged. Note that the second threshold value is smaller than the first threshold value. Each of such blown-out highlight and crushed shadow regions is subject to the processing in detection system 1 and is also referred to as a first processing target region. Therefore, black-white detector 311 according to the present embodiment detects, as the first processing target region, a region in the image data in which a phenomenon that is blown-out highlights or crushed shadows has occurred.

Flashing detector 312 obtains the event data output from event sensor 12 and detects, from the sensing region of event sensor 12, an event region in which a plus event and a minus event have repeatedly occurred at a frequency greater than or equal to a third threshold value. The third threshold value may be 24 Hz or may be 50 Hz, for example. The sensing region in the event data is associated with a region in a frame of the image data. Therefore, a region in the frame that corresponds to the event region in the sensing region corresponds to a region in which a fast-flashing detection target appears. Flashing detector 312 outputs event region information indicating the event region to image combiner 313. The event region information is information extracted from the event data and corresponds to the auxiliary information described above.

This means that flashing detector 312 according to the present embodiment detects, from the event data, a region in which a plus event and a minus event have repeatedly occurred at a frequency greater than or equal to the third threshold value and extracts, as the auxiliary information, information indicating that the region is flashing. The information indicating the event region may be information included in the auxiliary information described above. In this case, flashing detector 312 detects, from the event data, a region in which a plus event and a minus event have repeatedly occurred at a frequency greater than or equal to the third threshold value and extracts, as first auxiliary information included in the auxiliary information described above, information indicating that the region is flashing.

Image combiner 313 obtains the image data output from image sensor 11 and obtains the event data output from event sensor 12. Furthermore, image combiner 313 obtains the black-white region information from black-white detector 311 and obtains the event region information from flashing detector 312. Using the event data, the black-white region information, and the event region information that have been obtained, image combiner 313 combines a frame of the image data with an image, thereby generates a composite image, and then outputs the composite image to detector 41.

Detector 41 detects a detection target or a state of the detection target on the basis of the composite image.

Figure 6:
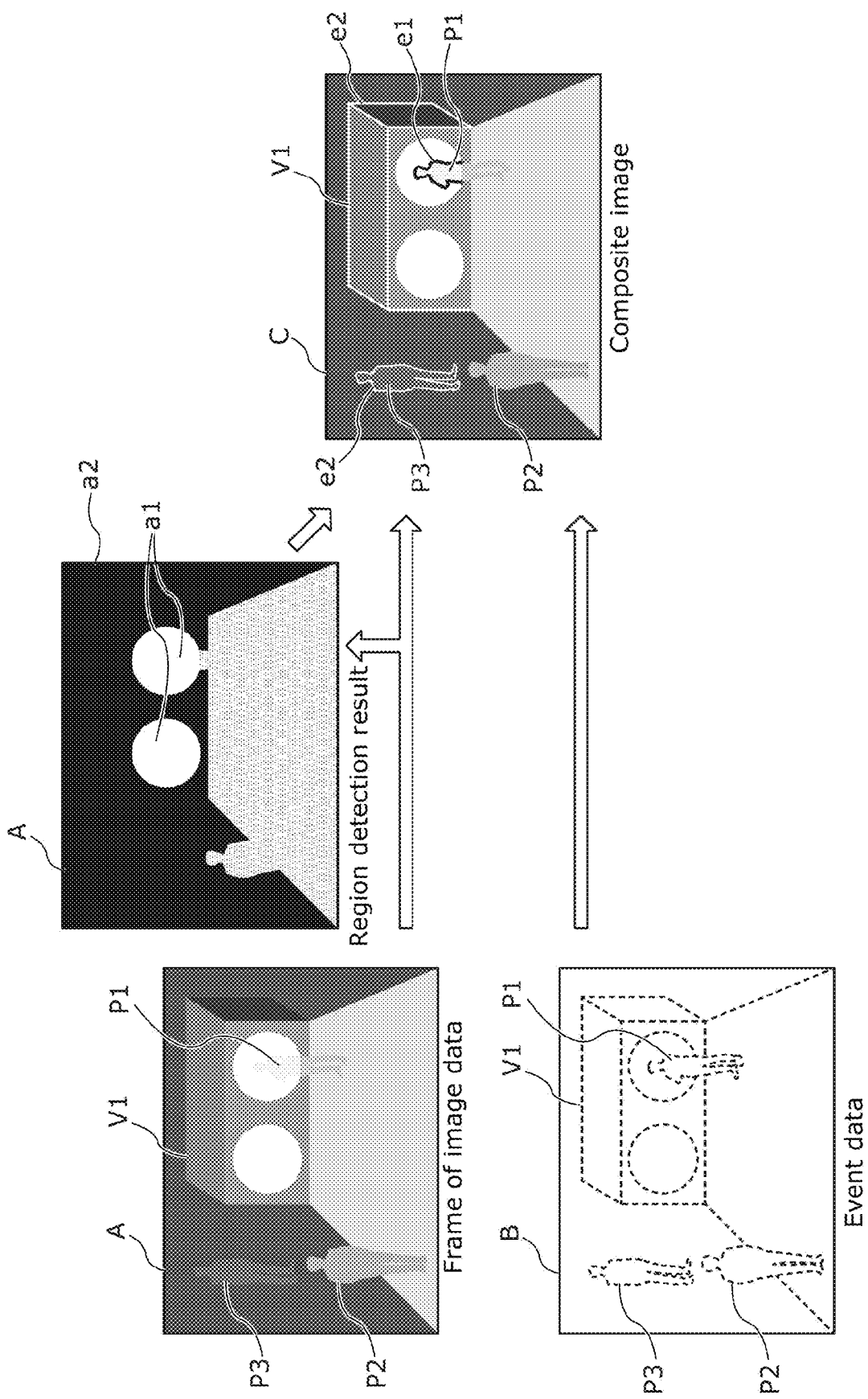
FIG. 6 is a diagram illustrating one example in which a detection system according to Embodiment 1 combines blown-out highlight regions and a crushed shadow region with images.

FIG. 6 is a diagram illustrating one example in which detection system 1 combines blown-out highlight regions and a crushed shadow region with images.

For example, image sensor 11 captures an image at night and outputs image data including frame A. In this frame A, oncoming vehicle V1 approaching vehicle V, persons P1, P2 illuminated by the headlights of oncoming vehicle V1, and person P3 not illuminated by the headlights of oncoming vehicle V1 appear. However, in this frame A, the upper body of person P1 that is very brightly illuminated with light from the headlights does not clearly appear. Furthermore, person P3 and portions other than the headlights of oncoming vehicle V1 are dark and thus do not clearly appear.

When black-white detector 311 obtains frame A, black-white detector 311 detects blown-out highlight regions a1 and crushed shadow region a2 from frame A. Subsequently, black-white detector 311 outputs, to image combiner 313, black-white region information indicating blown-out highlight regions a1 and crushed shadow region a2 of frame A. Specifically, the black-white region information indicates the positions and ranges of blown-out highlight regions a1 of frame A and the position and range of crushed shadow region a2 of frame A. In FIG. 6, the white regions are blown-out regions a1, and the black region is crushed shadow region a2.

Event sensor 12 outputs event data B generated when image sensor 11 captures the image at night as described above. This means that event sensor 12 outputs event data B indicating an event that has occurred at the time of the occurrence of the phenomenon that is blown-out highlights and crushed shadows. For example, event sensor 12 outputs event data B indicating an event that has occurred in a frame period in which frame A is generated. When one or more events have occurred at the same position in the frame period, event data B may indicate that there is an event occurring at that position. When two or more events have occurred at the same position in the frame period, event data B may indicate the last event that has occurred at that position. In this case, the polarity of the last event that has occurred may be indicated in event data B. When two or more events have occurred at the same position in the frame period, event data B may indicate the last two events that have occurred at that position. In this case, the polarity of each of the last two events that have occurred may also be indicated in event data B. When two or more events have occurred at the same position in the frame period, event data B may indicate an occurrence pattern of the events at that position. Examples of the occurrence pattern include a first occurrence pattern in which one or more plus events have occurred, a second occurrence pattern in which one or more minus events have occurred, and a third occurrence pattern in which both one or more plus events and one or more minus events have occurred. Event data B may indicate, as the occurrence pattern of the events at the position at which the two or more events mentioned above have occurred, one occurrence pattern among the first occurrence pattern, the second occurrence pattern, and the third occurrence pattern. When there is a position at which no event has occurred in the frame period, event data B may indicate a fourth occurrence pattern in which no event has occurred at that position.

Note that FIG. 6 illustrates a visualized version of event data B in order to facilitate understanding o of the processing performed by image combiner 313. Since event sensor 12 is installed on vehicle V and moves together with vehicle V, event data B indicates that an event has occurred at the contour of each of oncoming vehicle V1, the headlights, person P1, person P2, and person P3.

Image combiner 313 obtains frame A of the image data and event data B and obtains the black-white region information from black-white detector 311. Specifically, when image combiner 313 obtains frame A of the image data from image sensor 11, image combiner 313 extracts, from the event data output from event sensor 12, event data B generated when the image of frame A is captured. Furthermore, image combiner 313 obtains the black-white region information indicating blown-out highlight regions a1 and crushed shadow region a2 detected by black-white detector 311 from frame A. Subsequently, image combiner 313 specifies blown-out highlight regions a1 and crushed shadow region a2 from frame A on the basis of the black-white region information. Next, image combiner 313 extracts, from event data B, information indicating an event that has occurred at the position corresponding to each of blown-out highlight regions a1 and crushed shadow region a2 in frame A. Specifically, image combiner 313 specifies a position corresponding to blown-out highlight regions a1 in frame A from the sensing region in event data B, and extracts, from event data B, information indicating the contour of the upper body of person P1 as an event that has occurred at that position. Furthermore, image combiner 313 specifies a position corresponding to crushed shadow region a2 in frame A from the sensing region in event data B, and extracts, from event data B, information indicating the contour of each of oncoming vehicle V1 and person P3 as an event that has occurred at that position. The information indicating an event such as the contour corresponds to the auxiliary information described above, for example.

In other words, image combiner 313 according to the present embodiment extracts, from the event data as the auxiliary information, information indicating an event that has occurred at a position corresponding to the first processing target region in which a phenomenon that is blown-out highlights, crushed shadows, or the like has occurred, at the time of the occurrence of said phenomenon. The first processing target region is blown-out highlight regions a1 and crushed shadow region a2 in the above-described example. The information indicating an event may be information included in the auxiliary information described above. In this case, image combiner 313 extracts, from the event data as second auxiliary information included in the auxiliary information described above, information indicating an event that has occurred at a position corresponding to the first processing target region in which a phenomenon that is blown-out highlights, crushed shadows, or the like has occurred, at the time of the occurrence of said phenomenon.

Subsequently, image combiner 313 combines blown-out highlight regions a1 and crushed shadow region a2 in frame A of the image data with event images e1, e2 representing events such as the contours, thereby generating composite image C illustrated in FIG. 6, for example. In the example illustrated in FIG. 6, each of event images e1, e2 is a set of dots indicating the contour of a detection target. This set of dots appears as an outline; therefore, event images e1, e2 are handled as outlines below in the present disclosure. Note that the outlines may also be handled as boundary lines. Thus, image combiner 313 according to the present embodiment generates composite image C by combining the first processing target region in the image data with event images e1, e2 representing events. Note that combining the image data with event image e1 or e2 is also referred to as superimposition of event image e1 or e2. Combining in the present disclosure may be superimposition.

Thus, information included in the event data and indicating an event that has occurred at a position corresponding to the first processing target region is extracted as the auxiliary information. For example, when the event data indicates one or more events that have occurred in the entire range of the sensing region of event sensor 12, only information indicating, among the one or more events, an event that has occurred at a position corresponding to the first processing target region is extracted as the auxiliary information. Subsequently, the first processing target region in the image data is combined with an event image representing the event indicated in the auxiliary information such as the outline of the detection target, for example. Thus, detector 41 can easily detect the contour, etc., of the detection target that is located in the first processing target region. Specifically, even when the detection target is hard to see in each of a blown-out highlight region in which a phenomenon that is blown-out highlights has occurred and a crushed shadow region in which a phenomenon that is crushed shadows has occurred in the image data, the outline, etc., of the detection target is superimposed on the image data as the event image. As a result, the detection target can be easily detected. Furthermore, for a region other than the second processing target region in the image data, detector 41 can detect a detection target using an existing detection algorithm or image recognition process technique. Furthermore, since the image data combined with the event image is used to detect a detection target, machine learning in which an image is used in sample data for training (or training data) can be applied to that detection. Moreover, there is no need to detect a detection target from the event data, and thus the processing load in the detection can be significantly reduced.

At the time of combining blown-out highlight region a1 with the outline of the upper body of person P1 as event image e1, image combiner 313 combines blown-out highlight region a1 with the outline of a color different from the color of blown-out highlight region a1. For example, because the color of blown-out highlight region a1 is close to white, image combiner 313 may combine blown-out highlight region a1 with an outline of a color such as black, blue, or red. Alternately, at the time of combining blown-out highlight region a1 with event image e1 that is the outline of the upper body of person P1, image combiner 313 may combine blown-out highlight region a1 with an outline darker than blown-out highlight region a1.

At the time of combining crushed shadow region a2 with the outline of each of person P3 and oncoming vehicle V1 as event image e2, image combiner 313 combines crushed shadow region a2 with an outline of a color different from the color of crushed shadow region a2. For example, because the color of crushed shadow region a2 is close to black, image combiner 313 may combine crushed shadow region a2 with an outline of a color such as white, blue, or red. Alternatively, at the time of combining crushed shadow region a2 with the outline of each of person P3 and oncoming vehicle V1 as event image e2, image combiner 313 may combine crushed shadow region a2 with an outline brighter than crushed shadow region a2.

In this manner, when a blown-out highlight occurs as the phenomenon, image combiner 313 according to the present embodiment combines the first processing target region with event image e1 of a color different from the color of the image in the first processing target region or event image e1 at a luminance level lower than the luminance level of the image in the first processing target region. When a crushed shadow occurs as the phenomenon, image combiner 313 combines the first processing target region with event image e2 of a color different from the color of the image in the first processing target region or event image e2 at a luminance level higher than the luminance level of the image in the first processing target region.

Thus, in each of blown-out highlight region a1 and crushed shadow region a2, event image e1 or e2 such as an outline that can be easily identified from the image in that region is superimposed, and thus detector 41 can more easily detect the detection target.

Note that detector 41 may detect a detection target on the basis of composite image C or may detect a detection target using not only composite image C, but also frame A. Furthermore, detector 41 may use different parameters or methods for the detection in a region in composite image C that corresponds to blown-out highlight region a1, a region in composite image C that corresponds to crushed shadow region a2, and other regions.

Event image e1 to be combined with blown-out region a1 and event image e2 to be combined with crushed shadow region a2 may have the same luminance level and be of the same color. For example, the color of event images e1, e2 to be combined with these regions may be gray.

When event data B shows a plus event and a minus event, image combiner 313 may use dots of different colors or dots having different luminance levels as dots in the event image that represent the plus event and dots in the event image that represent the minus event. As a result, composite image C generated by image combiner 313 includes the aforementioned event image and thus indicates the polarity of each event that has occurred. Thus, detector 41 can specify not only an event, but also the polarity of the event, from composite image C and therefore can detect a detection target with higher accuracy.

Figure 7:
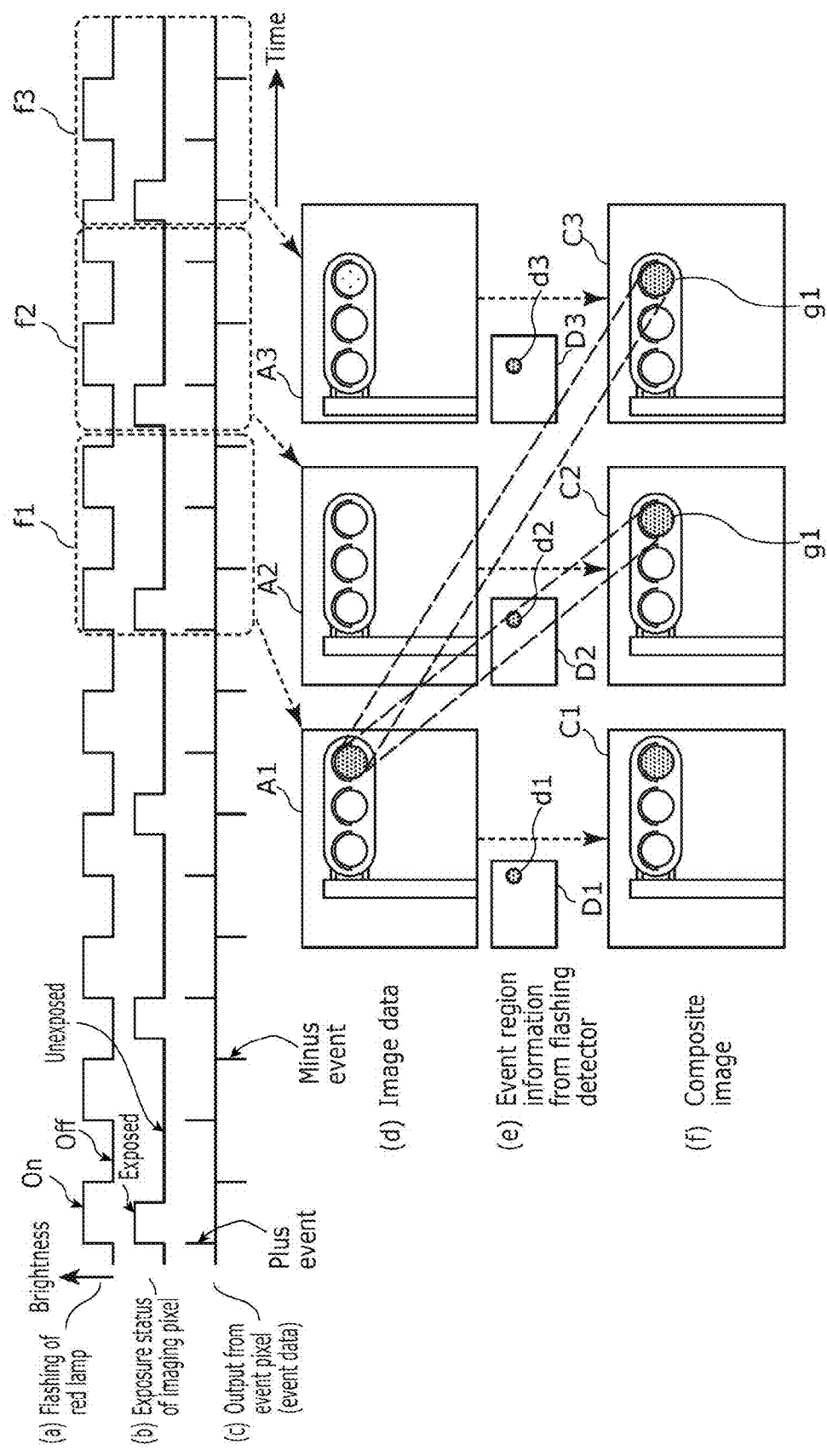
FIG. 7 is a diagram illustrating one example in which a detection system according to Embodiment 1 combines a fast-flashing region with an image.

FIG. 7 is a diagram illustrating one example in which detection system 1 combines a fast-flashing region with an image.

For example, the red lamp of the traffic light that is a light-emitting diode (LED) red lamp includes a plurality of red LEDs. In the case where these red LEDs inform a person of the red light, that is, in the case where these red LEDs display the red light, these red LEDs flash fast at the same timing. The period of this fast flashing is short and the frequency thereof is high; therefore, the red lamp appears to be not flashing, but be constantly ON to human eyes. One specific example of the frequency of the fast flashing is a frequency greater than or equal to the third threshold value mentioned above, which is 100 to 120 Hz, for example. FIG. 7 shows, in (a), a temporal change in the brightness of the red lamp. For example, as shown in (a) in FIG. 7, the red lamp repeatedly turning ON and OFF fast to inform a person of the red light.

Image sensor 11 performs global shutter imaging, for example. FIG. 7 shows, in (b), an exposure period and a non-exposure period of each imaging pixel included in image sensor 11. As shown in (b) in FIG. 7, the exposure period and the non-exposure period are alternately set for the imaging pixel. In the exposure period, the imaging pixel is exposed. As a result, the imaging pixel accumulates an amount of light received in the exposure period. In the non-exposure period, the imaging pixel is not exposed, and the amount of light accumulated until the non-exposure period is discarded.

Event sensor 12 outputs event data corresponding to the fast flashing of the red lamp. FIG. 7 shows the event data in (c). Specifically, event sensor 12 outputs event data indicating that a plus event has occurred at a position in the sensing region that corresponds to the red lamp when the red lamp turns ON and a minus event has occurred at the position when the red lamp turns OFF. In other words, event data is output that indicates that among the plurality of event pixels included in event sensor 12, an event pixel located at the position corresponding to the red lamp shows the occurrence of a plus event when the red lamp turns ON and shows the occurrence of a minus event when the red lamp turns OFF. Such a plus event and a minus event occur alternately according to the fast flashing of the red lamp.

The flashing of the red lamp shown in (a) in FIG. 7 and the frame cycle of image sensor 11 are not synchronized. Note that the frame cycle is a cycle in which exposure and non-exposure are repeated. Therefore, even when the red lamp appears to be ON to human eyes, the image data output from image sensor 11 may include a frame or the like in which the red lamp that is OFF appears. For example, as shown in (d) in FIG. 7, image sensor 11 generates frames A1, A2, A3 in frame periods f1, f2, f3, respectively. As shown in (a) and (b) in FIG. 7, the red lamp is ON in the entire exposure period in frame period f1. Therefore, in frame period f1, frame A1 in which the red lamp that is ON appears is generated. In contrast, the red lamp is OFF in the entire exposure period in frame period f2. Therefore, in frame period f2, frame A2 in which the red lamp that is OFF appears is generated. Furthermore, the red lamp is ON in a part of the exposure period in frame period F3 and is OFF in the remaining part. Therefore, in frame period f3, frame A3 in which the red lamp that is dimly lit appears is generated.

Flashing detector 312 detects an event region on the basis of the event data output from event sensor 12. Subsequently, flashing detector 312 outputs event region information indicating the event region. For example, flashing detector 312 generates event region information D1 on the basis of the data in frame period f1 that is included in the event data, as shown in (e) in FIG. 7. Furthermore, flashing detector 312 generates event region information D2 on the basis of the data in frame period f2 that is included in the event data. Moreover, flashing detector 312 generates event region information D3 on the basis of the data in frame period f3 that is included in the event data. Note that event region information D1, D2, D3 illustrated in FIG. 7 is a visualized version thereof for facilitating understanding of the processing performed by image combiner 313.

In frame period f1, the event data shows the occurrence of a plus event and the occurrence of a minus event in the region corresponding to the red lamp. Therefore, flashing detector 312 generates event region information D1 indicating, as event region d1, the region corresponding to the red lamp. Similarly, in frame period f2, the event data shows the occurrence of a plus event and the occurrence of a minus event in the region corresponding to the red lamp. Therefore, flashing detector 312 generates event region information D2 indicating, as event region d2, a red lamp region included in the sensing region. Similarly, in frame period f3, the event data shows the occurrence of a plus event and the occurrence of a minus event in the region corresponding to the red lamp. Therefore, flashing detector 312 generates event region information D3 indicating, as event region d3, a red lamp region included in the sensing region. Note that event region information D1, D2, D3 specifically indicate the positions and ranges of event regions d1, d2, d3. Event region information D1, D2, D3 generated as just described is output to image combiner 313.

When image combiner 313 obtains frame A1 of the image data, image combiner 313 determines that the red lamp appearing in frame A1 is ON. In this case, image combiner 313 outputs frame A1 as composite image C1, as illustrated in (f) in FIG. 7. In contrast, when image combiner 313 obtains frame A2 of the image data, image combiner 313 determines that the red lamp appearing in frame A2 is OFF. In this case, image combiner 313 specifies, as the second processing target region, a region in frame A2 that corresponds to event region d2 indicated in event region information D2. Subsequently, image combiner 313 combines the second processing target region with ON image g1 indicating that a detection target, that is, the red lamp, is ON, and thus generates composite image C2. When image combiner 313 obtains frame A3 of the image data, image combiner 333 determines that the red lamp appearing in frame A3 is dimly lit. In this case, image combiner 313 specifies, as the second processing target region, a region in frame A3 that corresponds to event region d2 indicated in event region information D3. Subsequently, image combiner 313 combines the second processing target region with ON image g1 indicating that a detection target, that is, the red lamp, is ON, and thus generates composite image C3.

In this manner, image combiner 313 according to the present embodiment generates composite images C2, C3 by combining the second processing target region in the image data, that is, the second processing target region corresponding to the event region indicated in the auxiliary information such as the event region information, with ON image g1 indicating that a detection target is ON. On the basis of composite images C1, C2, C3, detector 41 detects a detection target that is the red lamp or a state of the detection target.

Furthermore, in determining whether the red lamp is ON, image combiner 313 may use the luminance of the second processing target region (that is, a region in which the fast flashing occurs) in a frame. For example, when the luminance is greater than or equal to a threshold value, image combiner 313 may determine that the red lamp is ON and, conversely, when the luminance is less than the threshold value, image combiner 313 may determine that the red lamp is OFF. Furthermore, image combiner 313 may use a period in which the exposure period in one frame and the event interval between the time of the occurrence of a plus event and the time of the occurrence of the following minus event overlap each other (hereinafter also referred to as an overlap period). When the overlap period is greater than or equal to a threshold value, image combiner 313 may determine that the red lamp appearing in the frame is ON and, conversely, when the overlap period is less than the threshold value, image combiner 313 may determine that the red lamp appearing in the frame is OFF.

Furthermore, ON image g1 described above may be an image stored in image combiner 313 in advance. This means that image combiner 313 may replace the image in the second processing target region with ON image g1 having predetermined pixel values. For example, when each event pixel included in event sensor 12 is sensitive to red light, image combiner 313 may replace the image in the second processing target region with red ON image g1. Note that in the present disclosure, being sensitive to light of one color such as red means being more sensitive to light of that one color than to light of other colors. In one typical example, an event pixel that is sensitive to red light is sensitive to the red light only.

Furthermore, image combiner 313 may increase the luminance level of the image in the second processing target region and thus combine ON image g1. Image combiner 313 may extract the image of the red lamp appearing in frame A1 in the ON state from frame A1 as ON image g1 and combine the second processing target region with this ON image g1. FIG. 7 shows an example in which ON image g1 extracted from frame A1 is used in the combining. Note that when a plus event occurs at the timing of the start of exposure of an event pixel or a timing close to the time of the start of the exposure, image combiner 313 may extract, as ON image g1, the image of the red lamp appearing in the frame generated by the start of the exposure.

Alternatively, image combiner 313 may extract, as ON image g1, the image of the red lamp appearing at the highest luminance in frames obtained in the respective frame periods in which plus and minus events have occurred. Furthermore, at the time of combining the second processing target region with ON image g1, image combiner 313 may perform motion detection on the image of the red lamp appearing in a frame and combine the image at the position corresponding to the motion with ON image g1. At this time, image combiner 313 may use the second processing target region. Furthermore, image combiner 313 may combine ON image g1 using artificial intelligence, machine learning, or the like.

When a frame is generated by rolling shutter imaging, image combiner 313 may use, as the ON image, the image of a line included in the frame. Specifically, image combiner 313 may combine the image of a line in which a portion of the red lamp that is not ON appears, in the second processing target region in a frame, with an image located around the line, that is, the image of a line in which a portion of the red lamp that is ON appears, as the ON image. Alternatively, image combiner 313 may extract an ON image from a different frame for each line and combine the line with the ON image.

In this manner, in detection system 1 according to the present embodiment, the detection is performed using composite images C1, C2, C3, and thus a detection target can be detected with increased accuracy. For example, the red lamp of the traffic light displays the red light by flashing at a high frequency. Such a red lamp that displays the red light appears to be not flashing, but be constantly ON to human eyes. Meanwhile, when image sensor 11 having an exposure period set short in order to avoid the aforementioned phenomenon that is blown-out highlights captures an image of the red lamp that displays the red light as the detection target, for example, image sensor 11 may output image data including a frame in which the red lamp that is OFF appears.

Therefore, with the image data alone, it may be erroneously determined that the red light is not displayed. However, with detection system 1 according to the present embodiment, in this case, the auxiliary information indicating that a plus event and a minus event have repeatedly occurred in a region corresponding to the second processing target region in which the red lamp appears is extracted. Subsequently, the second processing target region is combined with ON image g1. Therefore, even when the red lamp that is OFF appears as the detection target in the second processing target region in a frame included in the image data, the second processing target region is combined with ON image g1; thus, detector 41 can correctly detect that the red light is displayed. This means that erroneous detection of the detection target can be minimized. Furthermore, since the exposure period may be set short, in other words, since there is no need to set a limit on the exposure period, a wide dynamic range can be used. Note that the detection target is the red lamp of a traffic light in this example, but even when the detection target is a brake lamp of a vehicle, it is possible to produce advantageous effects that are substantially the same as those produced in this example.

Figure 8:
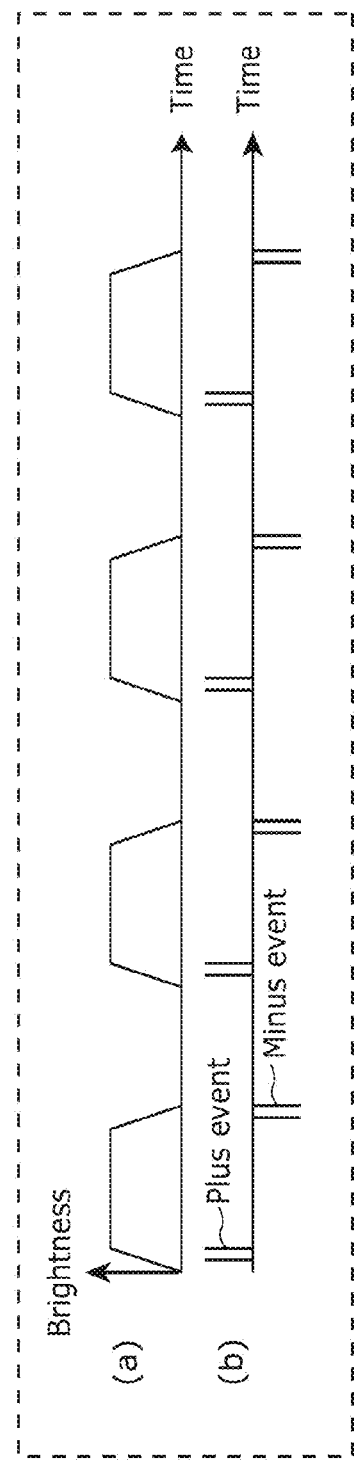
FIG. 8 is a diagram illustrating one example of event data and fast flashing of a red lamp of a traffic light that is subject to processing by a detection system according to Embodiment 1.

FIG. 8 is a diagram illustrating another example of the event data and the fast flashing of the red lamp of a traffic light that is subject to processing by detection system 1. FIG. 8 shows, in (a), a temporal change in the brightness of the red lamp. FIG. 8 shows, in (b), event data corresponding to the temporal change in the brightness of the red lamp. As shown in (a) in FIG. 8, the red lamp flashes fast in substantially the same manner as in the example shown in (a) in FIG. 7. In the example shown in (a) in FIG. 8, however, the level of brightness of the red lamp increases more slowly and decreases more slowly than in the example shown in (a) in FIG. 7. In such a case, as shown in (b) in FIG. 8, the event data indicates the occurrence of two or more consecutive plus events when the level of brightness of the red lamp increases, and indicates the occurrence of two or more consecutive minus events when the level of brightness of the red lamp decreases. Even in such a case, similar to the example shown in FIG. 7, flashing detector 312 generates and outputs event region information indicating the event region as long as the event data indicates the occurrence of plus and minus events in one frame period.

Figure 9:
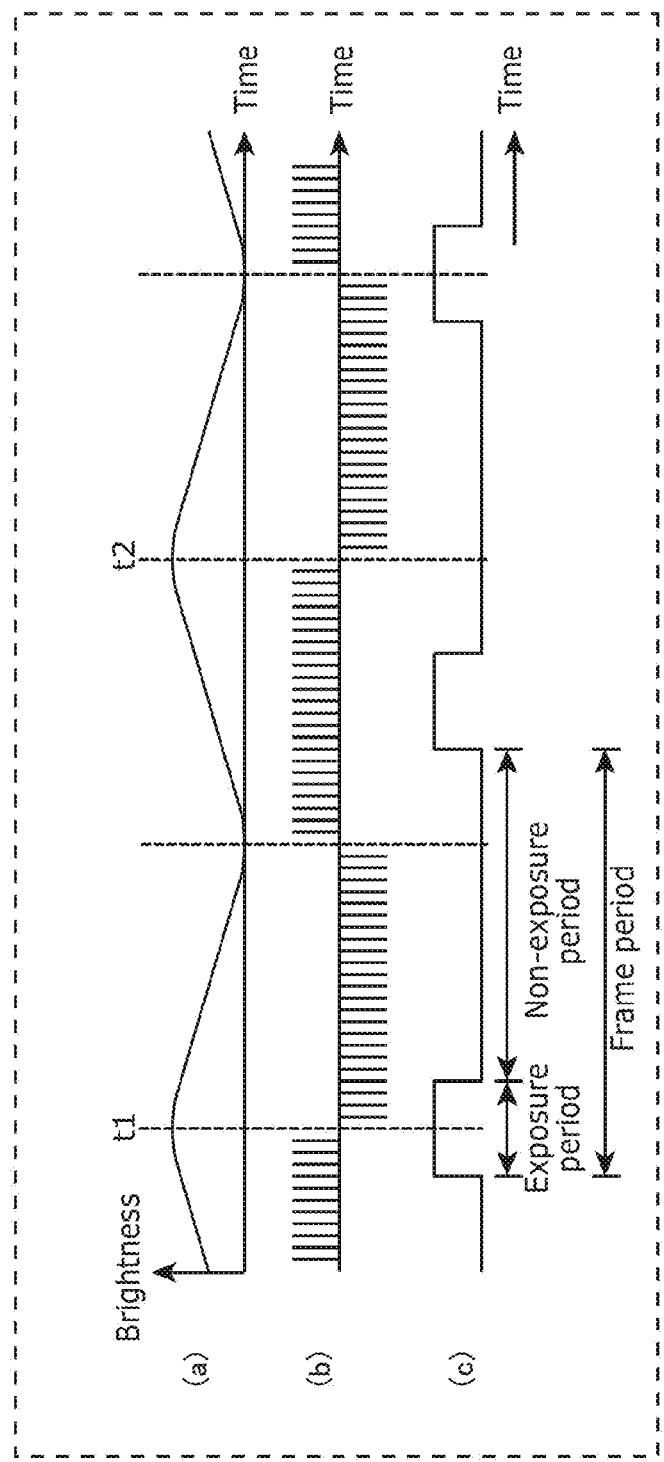
FIG. 9 is a diagram illustrating another example of event data and fast flashing of a red lamp of a traffic light that is subject to processing by a detection system according to Embodiment 1.

FIG. 9 is a diagram illustrating yet another example of the event data and the fast flashing of the red lamp of the traffic light.

For example, the red lamp of the traffic light that is a light-bulb red lamp includes a light bulb that emits red light. FIG. 9 shows, in (a), one example of a temporal change in the brightness of a light-bulb red lamp. The level of brightness of this red lamp increases and decreases at a frequency of 50 Hz or 60 Hz, for example, like a sine curve, as shown in (a) in FIG. 9. Event sensor 12 outputs event data corresponding to this change in the brightness of the red lamp. FIG. 9 shows the event data in (b). Specifically, when the level of brightness of the red lamp increases at a position in the sensing region that corresponds to the red lamp, event sensor 12 indicates that a larger number of plus events have occurred than in the example shown in FIG. 8. Furthermore, when the level of brightness of the red lamp decreases at a position in the sensing region that corresponds to the red lamp, event sensor 12 indicates that a larger number of minus events have occurred than in the example shown in FIG. 8. In this manner, in the example shown in (b) in FIG. 9, a large number of plus events and a large number of minus events repeatedly occur at short intervals compared to the examples shown in FIG. 7 and FIG. 8. Furthermore, FIG. 9 shows, in (c), the exposure period and the non-exposure period of each imaging pixel included in image sensor 11.

Even in the case of the example shown in FIG. 9, image combiner 313 specifies time t1 and time t2 at which the event indicated in the event data changes from a plus event to a minus event, similar to the example shown in FIG. 7. In other words, when a minus event occurs following a plus event, image combiner 313 specifies the time in the middle between the times of the occurrences of these events. Subsequently, image combiner 313 retrieves, from among time t1 and time t2, time t1 located closest to the middle point of the exposure period of the imaging pixel, and extracts an ON image from the frame generated in the frame period including time t1 retrieved.

Figure 10:
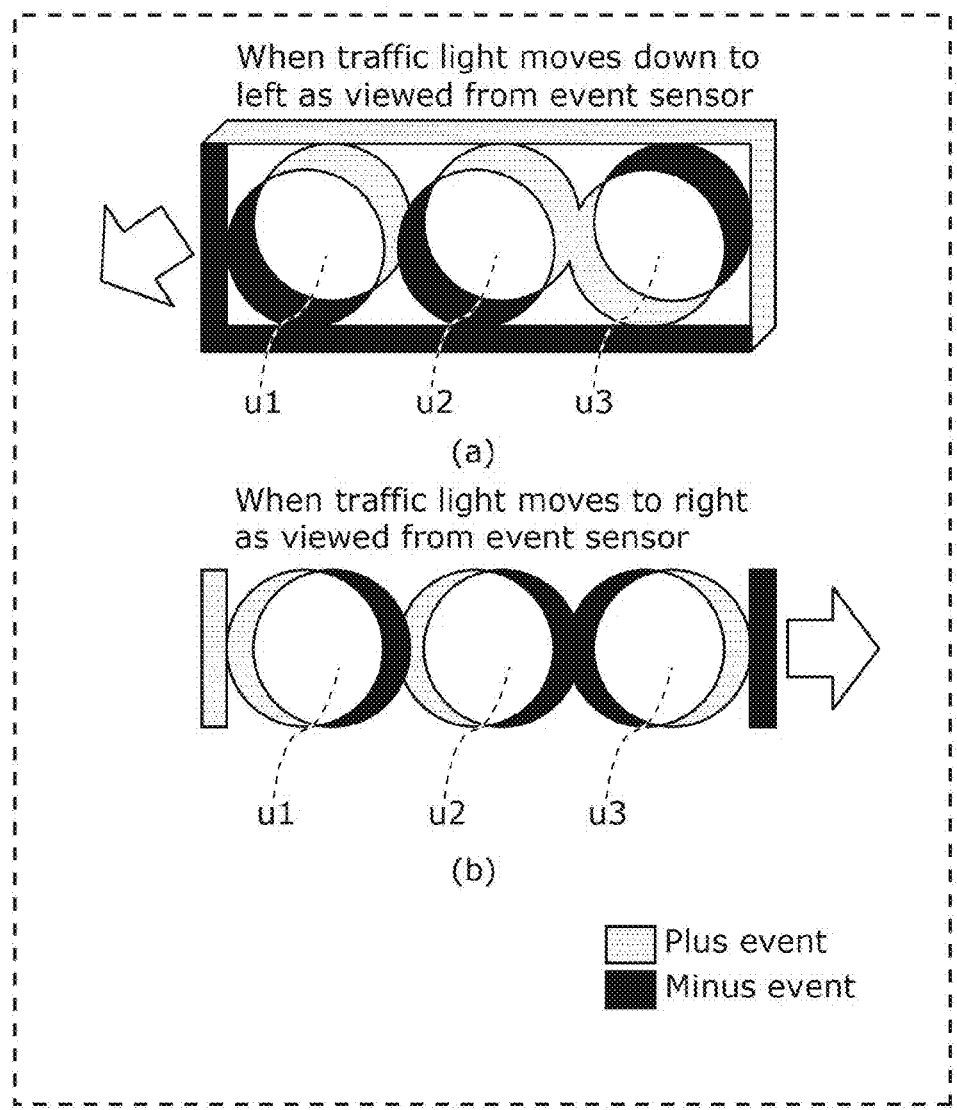
FIG. 10 is a diagram for describing a red light determination process performed by an image combiner according to Embodiment 1.

FIG. 10 is a diagram for describing the red light determination process performed by image combiner 313. Note that FIG. 10 illustrates, in (a), the event data output from event sensor 12 when the traffic light moves down to the left as viewed from event sensor 12; in (a) in FIG. 10, a visualized version of that event data is illustrated. Furthermore, FIG. 10 illustrates, in (b), the event data output from event sensor 12 when the traffic light moves to the right as viewed from event sensor 12; a visualized version of that event data is illustrated also in (b) in FIG. 10. In the example illustrated in FIG. 10, the red lamp of the traffic light does not perform flashing such as fast flashing, but is constantly ON, to display the red light. At this time, the other lamps, i.e., the blue lamp and the yellow lamp, are OFF.

As illustrated in (a) in FIG. 10, when the traffic light moves down to the left as viewed from event sensor 12, the event data indicates that events have occurred on the perimeter of the lighting part of the traffic light and the perimeter of each of three lamps u1, u2, u3. Furthermore, as illustrated in (b) in FIG. 10, when the traffic light moves to the right as viewed from event sensor 12, the event data indicates that events have occurred on the perimeter of the lighting part of the traffic light and the perimeter of each of three lamps u1, u2, u3. Note that three lamps u1, u2, u3 are the blue lamp, the yellow lamp, and the red lamp. Each event pixel included in event sensor 12 is sensitive to clear light. Note that the clear light is white light, for example. This means that each event pixel is sensitive to light of two or more colors such as red, green, and blue. In this case, when the amount of light received increases, event sensor 12 outputs event data indicating the occurrence of a plus event. Conversely, when the amount of light received decreases, event sensor 12 outputs event data indicating the occurrence of a minus event.

Therefore, when the red lamp, which is one of three lamps u1, u2, u3 of the traffic light, turns ON and displays the red light, the polarity of the event occurring on the perimeter of the red lamp is reversed from the polarity of the event occurring on the perimeter of each of the other two lamps. In other words, the polarity of the event occurring on the perimeter of the red lamp is opposite to the event occurring on the perimeter of each of the other two lamps.

Thus, at the time of determining whether the traffic light displays the red light, image combiner 313 first detects the traffic light from a frame of the image data. Next, image combiner 313 detects the red lamp from among three lamps u1, u2, u3 of the traffic light. For example, on the basis of the arrangement of three lamps u1, u2, u3, image combiner 313 determines that the rightmost lamp, that is, lamp u3, is the red lamp. Subsequently, image combiner 313 refers to the event data and determines whether the polarity of an event occurring on the perimeter of lamp u3 is opposite to the polarity of an event occurring on the perimeter of each of other lamps u1, u2. When image combiner 313 determines that the polarity of the event on lamp u3 is opposite, image combiner 313 determines that lamp u3, that is, the red lamp, is ON and the red light is displayed.

Note that image combiner 313 may determine, using artificial intelligence, machine learning, or the like, whether the traffic light displays the red light. Even in this case, event data indicating not only an event, but also the polarity of the event, just as the event data illustrated in FIG. 10, is required.

Figure 11:
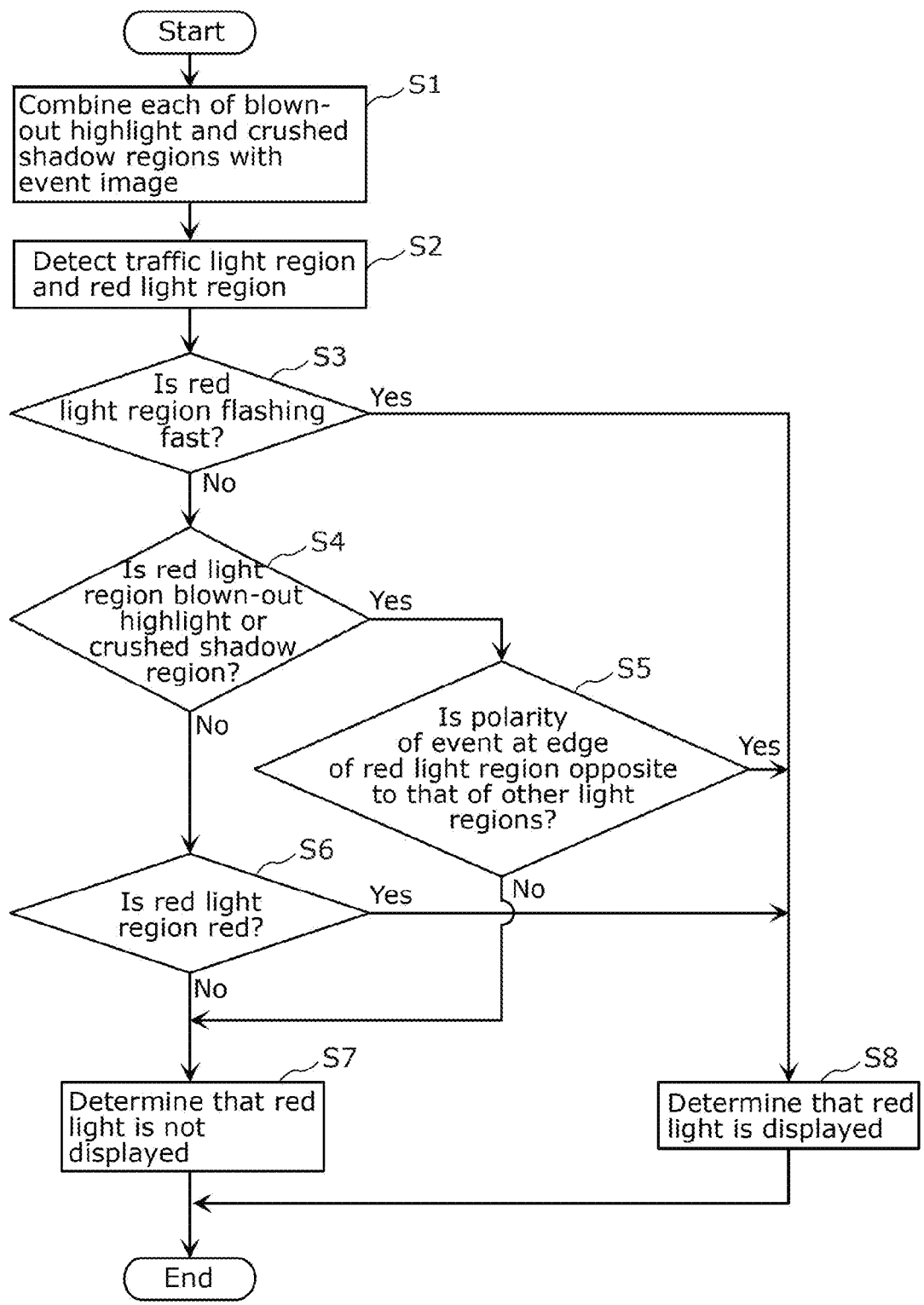
FIG. 11 is a flowchart illustrating one example of the processing operation of an image combiner according to Embodiment 1.

FIG. 11 is a flowchart illustrating one example of the processing operation of image combiner 313.

First, image combiner 313 combines each of the blown-out highlight region and the crushed shadow region in the frame of the image data with an event image such as an outline (Step S1). Next, image combiner 313 detects a traffic light region and a red light region from the frame (Step S2). The traffic light region is a region in which the lighting part of the traffic light appears, and the red light region is a region in which the red lamp appears in the traffic light region. Note that when the traffic light region and the red light region are included in any of the blown-out highlight region and the crushed shadow region mentioned above, image combiner 313 detects the traffic light region and the red light region on the basis of the event image combined in Step S1. Furthermore, for example, image combiner 313 may detect the red light region using a method substantially the same as the method illustrated in FIG. 19 described later in which detector 41 detects the red light region.

Next, on the basis of the event region information output from flashing detector 312, image combiner 313 determines whether the red light region is flashing fast (Step S3). Specifically, image combiner 313 determines whether the red lamp appearing in the red light region is flashing fast. When image combiner 313 determines that the red light region is flashing fast (Yes in Step S3), image combiner 313 determines that the red light is displayed (Step S8). On the other hand, when image combiner 313 determines that the red light region is not flashing fast (No in Step S3), image combiner 313 determines whether the red light region is a blown-out highlight region or a crushed shadow region (Step S4). When image combiner 313 determines that the red light region is neither a blown-out highlight region nor a crushed shadow region (No in Step S4), image combiner 313 determines whether the image in the red light region appearing in the aforementioned frame is red (or is of a red color having luminance of at least a threshold value) (Step S6). When image combiner 313 determines that the image in the red light region is red (Yes in Step S6), image combiner 313 determines that the red light is displayed (Step S8). On the other hand, when image combiner 313 determines that the image in the red light region is not red (No in Step S6), image combiner 313 determines that the red light is not displayed (Step S7).

On the other hand, when image combiner 313 determines in Step S4 that the red light region is one of a blown-out highlight region and a crushed shadow region (Yes in Step S4), image combiner 313 determines the polarity of an event at the edge of the red light region (Step S5). Specifically, image combiner 313 refers to the event data and determines whether the polarity of the event at the edge of the red light region is opposite to the polarity of the event at the edges of the other light regions. The event at the edge of the red light region is an event occurring on the perimeter of lamp u3 mentioned above, and the event at the edges of the other light regions is an event occurring on the perimeter of each of lamps u1, u2 mentioned above. When image combiner 313 determines that the polarity of the event is opposite (Yes in Step S5), image combiner 313 determines that the red light is displayed (Step S8). On the other hand, when image combiner 313 determines that the polarity of the event is not opposite (No in Step S5), image combiner 313 determines that the red light is not displayed (Step S7).

Figure 12:
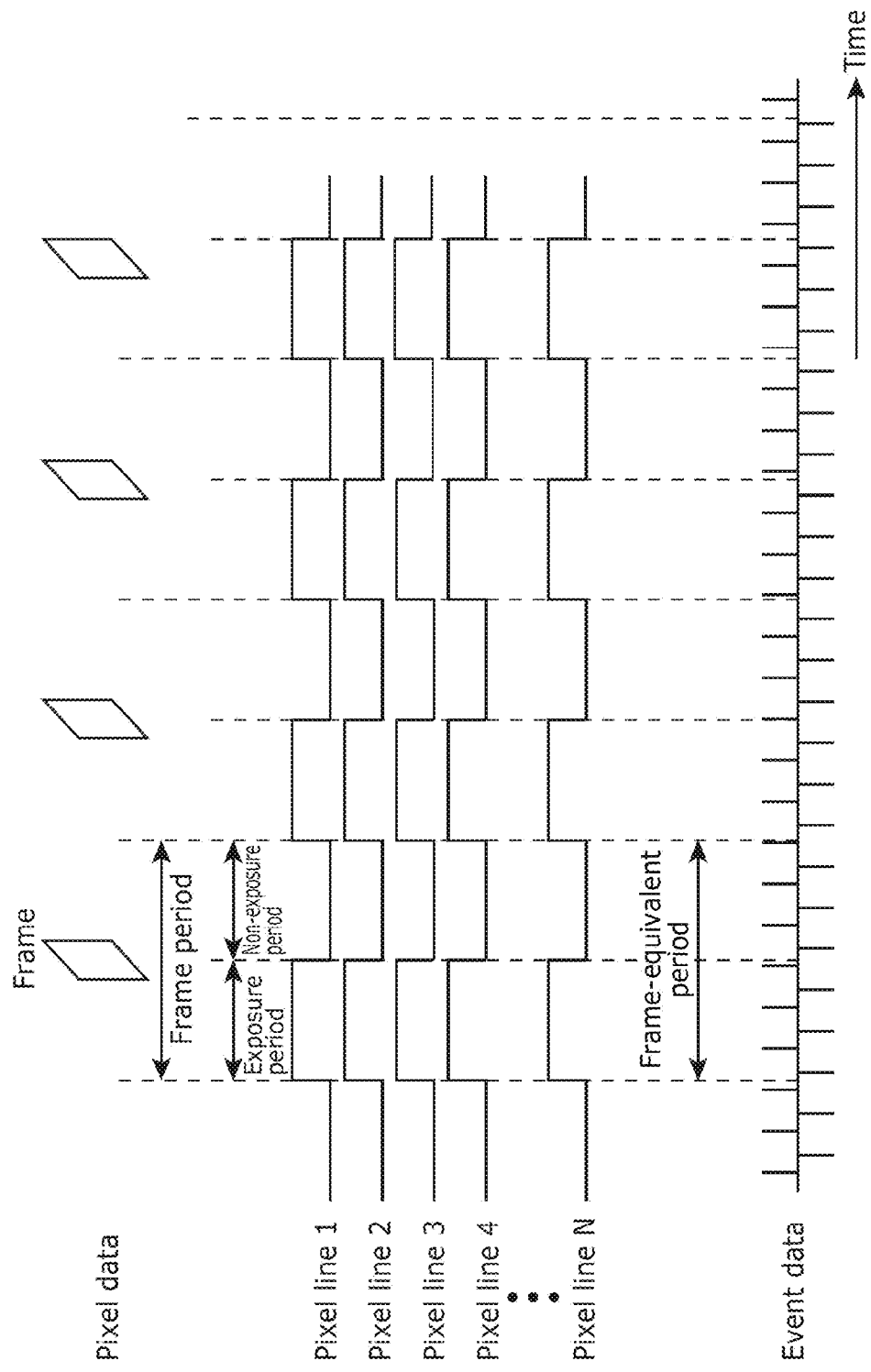
FIG. 12 is a diagram illustrating one example of the correspondence relationship between image data and event data according to Embodiment 1.

FIG. 12 is a diagram illustrating one example of the correspondence relationship between the image data and the event data.

For example, image sensor 11 generates image data by global shutter imaging. In this case, in pixel lines 1 to N (N is an integer greater than or equal to 2) of image sensor 11, the transition between the exposure period and the non-exposure period occurs at the same timing, as illustrated in FIG. 12. A period including the exposure period and the non-exposure period corresponds to a frame period, and one frame included in the image data is generated in the frame period. Note that image sensor 11 is made up of a plurality of imaging pixels arranged in a matrix, and a pixel line is made up of a plurality of imaging pixels arranged in one line among the plurality of imaging pixels.

Preprocessor 31 according to the present embodiment, specifically, at least one of flashing detector 312 and image combiner 313, specifies, from the event data, data in a frame-equivalent period that corresponds to the frame. Subsequently, on the basis of the data in the frame-equivalent period, preprocessor 31 checks a situation in which an event occurs in the frame. Specifically, on the basis of the data in the frame-equivalent period, flashing detector 312 and image combiner 313 check a situation in which an event occurs for the frame. In other words, by identifying an event that has occurred at a time in the frame-equivalent period among the plurality of events indicated in the event data, flashing detector 312 and image combiner 313 check an event occurrence situation corresponding to the frame.

In this manner, in the present embodiment, the image data is generated by global shutter imaging, and when the image data includes a frame including the first processing target region such as a blown-out highlight region, image combiner 313 determines the time of the occurrence of a phenomenon that is blown-out highlights or the like according to the timing at which the frame is generated. Subsequently, image combiner 313 extracts, from the event data as the auxiliary information, event region information indicating an event that has occurred at said time at a position corresponding to the first processing target region.

Thus, the time at which a phenomenon that is blown-out highlights or crushed shadows has occurred is determined according to the timing at which the frame including the first processing target region is generated, and the auxiliary information indicating an event that has occurred at said time is extracted. As a result, when two or more frames each including the first processing target region are generated, the time at which the aforementioned phenomenon has occurred is determined for each frame according to the timing at which the frame is generated, and the auxiliary information indicating an event that has occurred at said time is extracted. Therefore, the event indicated in the auxiliary information extracted and the first processing target region can be temporally associated in an appropriate manner, and a detection target or a state of the detection target can be detected with improved accuracy.

Figure 13:
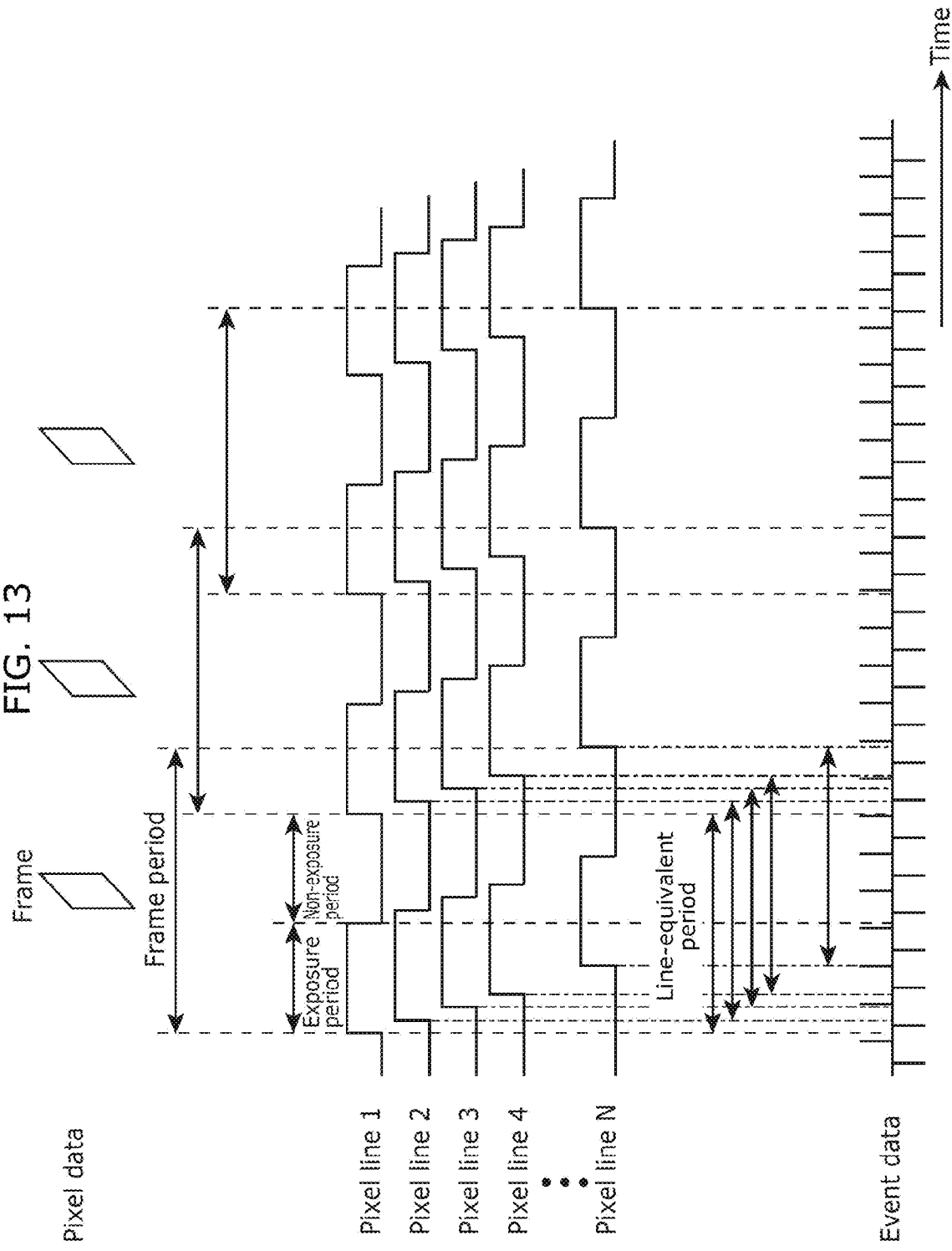
FIG. 13 is a diagram illustrating another example of the correspondence relationship between image data and event data according to Embodiment 1.

FIG. 13 is a diagram illustrating another example of the correspondence relationship between the image data and the event data.

For example, image sensor 11 generates image data by rolling shutter imaging. In this case, in pixel lines 1 to N of image sensor 11, the transition between the exposure period and the non-exposure period occurs at different timings, as illustrated in FIG. 13. A period including the exposure period and the non-exposure period of pixel lines 1 to N corresponds to a frame period, and one frame included in the image data is generated in the frame period. The frame is made up of a plurality of lines generated by pixel lines 1 to N and arranged in the column direction.

Preprocessor 31 according to the present embodiment, specifically, at least one of flashing detector 312 and image combiner 313, specifies, from the event data for each line included in the frame, data in a line-equivalent period that corresponds to the line. The line-equivalent period is a period including the exposure period and the non-exposure period of one pixel line used in the line generation. Subsequently, on the basis of the data in the line-equivalent period, preprocessor 31 checks a situation in which an event occurs in the line. Specifically, on the basis of the data in the line-equivalent period, flashing detector 312 and image combiner 313 check a situation in which an event occurs for the line. In other words, by identifying an event that has occurred at a time in the line-equivalent period among the plurality of events indicated in the event data, flashing detector 312 and image combiner 313 check an event occurrence situation corresponding to the line.

In this manner, in the present embodiment, the image data is generated by rolling shutter imaging, and when the image data includes a frame including the first processing target region such as a blown-out highlight region, image combiner 313 determines the time of the occurrence of a phenomenon that is blown-out highlights or the like according to the timing at which, among the plurality of lines included in the frame, a line including at least a portion of the first processing target region is generated. Subsequently, image combiner 313 extracts, from the event data as the auxiliary information, event region information indicating an event that has occurred at said time at a position corresponding to at least a portion of the first processing target region.

Thus, the time at which a phenomenon that is blown-out highlights or crushed shadows has occurred is determined according to the timing at which the line including at least a portion of the first processing target region is generated, and the auxiliary information indicating an event that has occurred at said time is extracted. As a result, when two or more lines each including a portion of the first processing target region are generated, the time at which the aforementioned phenomenon has occurred is determined for each line according to the timing at which the line is generated, and the auxiliary information indicating an event that has occurred at said time is extracted. Therefore, the event indicated in the auxiliary information extracted and at least a portion of the first processing target region can be temporally associated in an appropriate manner, and a detection target or a state of the detection target can be detected with improved accuracy.

Note that the point in time at which the frame period starts is the point in time at which the exposure period starts in the examples illustrated in FIG. 12 and FIG. 13, but may be the point in time in the middle of the exposure period or may be the point in time at which the exposure period ends; the point in time at which the frame period starts is not limited to one point in time. Furthermore, the frame period and the frame-equivalent period do not need to exactly match each other and may be different within the range where the advantageous effects of the present disclosure can be produced. Similarly, the period in a pixel line that includes the exposure period and the non-exposure period and the line-equivalent period corresponding to that pixel line do not need to exactly match each other and may be different within the range where the advantageous effects of the present disclosure can be produced.

Figure 14:
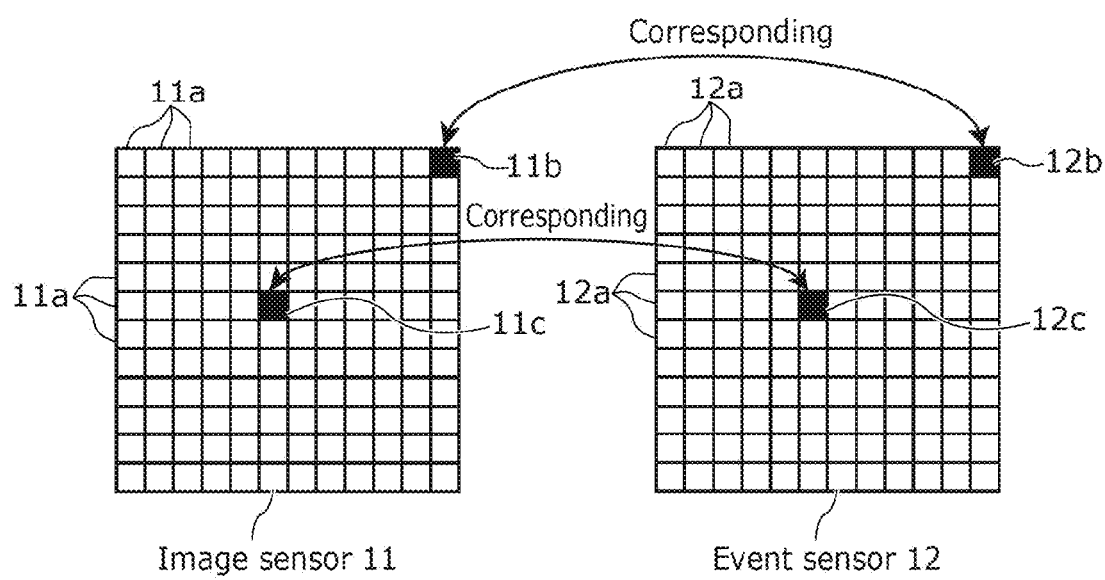
FIG. 14 is a diagram illustrating one example of the correspondence relationship between imaging pixels of an image sensor and event pixels of an event sensor according to Embodiment 1.

FIG. 14 is a diagram illustrating one example of the correspondence relationship between the imaging pixels of image sensor 11 and the event pixels of event sensor 12.

As illustrated in FIG. 14, image sensor 11 is composed of the plurality of imaging pixels 11a arranged in a matrix. Similarly, event sensor 12 is composed of the plurality of event pixels 12a arranged in a matrix, as illustrated in FIG. 14. Each of the plurality of imaging pixels 11a of image sensor 11 is associated with one of the plurality of event pixels 12a of event sensor 12 in advance. This means that imaging pixel 11a included in image sensor 11 and event pixel 12a included in event sensor 12 are associated with each other in advance so as to receive the same light from a detection target. For example, imaging pixel 11b located at the top right corner among the plurality of imaging pixels 11a is associated with event pixel 12b located at the top right corner among the plurality of event pixels 12a. Similarly, imaging pixel 11c among the plurality of imaging pixels 11a is associated with event pixel 12c among the plurality of event pixels 12a.

Accordingly, each pixel region included in a frame of the image data output from image sensor 11 is also associated with a corresponding element region included in the sensing region of event sensor 12. The pixel region in the frame is a region in which one pixel value obtained by the imaging pixel is represented, and the element region in the sensing region is a region in which one event output from the event pixel is represented.

Since the imaging pixel and the event pixel are associated with each other in advance as just described, image combiner 313 can specify, in the sensing region of event sensor 12, the position of a region corresponding to each of blown-out highlight and crushed shadow regions in the image data, for example. Subsequently, image combiner 313 can extract, from the event data, information indicating an event that has occurred at that position.

Note that in the example illustrated in FIG. 14, the number of pixels in image sensor 11 and the number of pixels in event sensor 12 are the same, and the arrangement of the plurality of pixels in image sensor 11 and the arrangement of the plurality of pixels in event sensor 12 are also the same, but these may be different. For example, two or more imaging pixels in image sensor 11 and one event pixel in event sensor 12 may be associated with each other. Furthermore, in the present embodiment, the task of associating the imaging pixel and the event pixel needs to be performed in advance, and this task of associating is also referred to as positioning or aligning.

Figure 15:
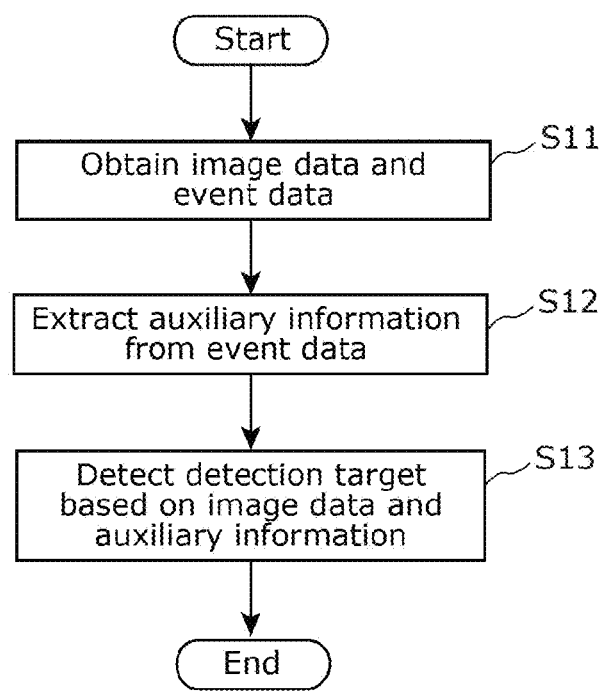
FIG. 15 is a diagram illustrating one example of the outline processing operation of a detection system according to Embodiment 1.

FIG. 15 is a diagram illustrating one example of the outline processing operation of detection system 1 according to the present embodiment.

Input unit 21 of detection system 1 obtains image data and event data from image sensor 11 and event sensor 12 (Step S11). These image data and event data are generated on the basis of light received from a detection target. Next, preprocessor 31 extracts, from the event data as auxiliary information, information to be used to assist in detecting the detection target from the image data (Step S12). Subsequently, detector 41 detects the detection target or the state of the detection target on the basis of the image data and the auxiliary information.

Thus, detector 41 does not need to use the entire event data, meaning that the amount of data required by detector 41 in the detection can be reduced and as a result, the processing load in the detection can be reduced.

Variation 1 of Embodiment 1

In the present embodiment, preprocessor 31 includes black-white detector 311 and flashing detector 312. The preprocessor according to the present variation does not include one of black-white detector 311 and flashing detector 312.

Figure 16:
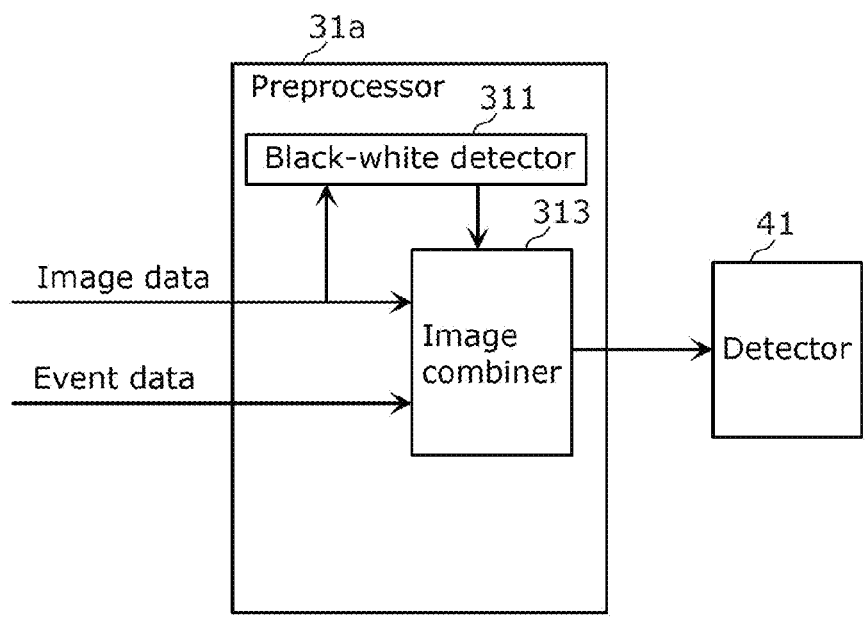
FIG. 16 is a block diagram illustrating one example of the configuration of a preprocessor according to Variation 1 of Embodiment 1.

FIG. 16 is a block diagram illustrating one example of the configuration of the preprocessor according to Variation 1 of the present embodiment.

For example, preprocessor 31a according to the present variation includes black-white detector 311 and image combiner 313, but does not include flashing detector 312, as illustrated in FIG. 16. Detection system 1 including preprocessor 31a just described combines each of the blown-out highlight and crushed shadow regions in a frame with an event image showing the contour, etc., of a detection target, similar to the example illustrated in FIG. 6.

Figure 17:
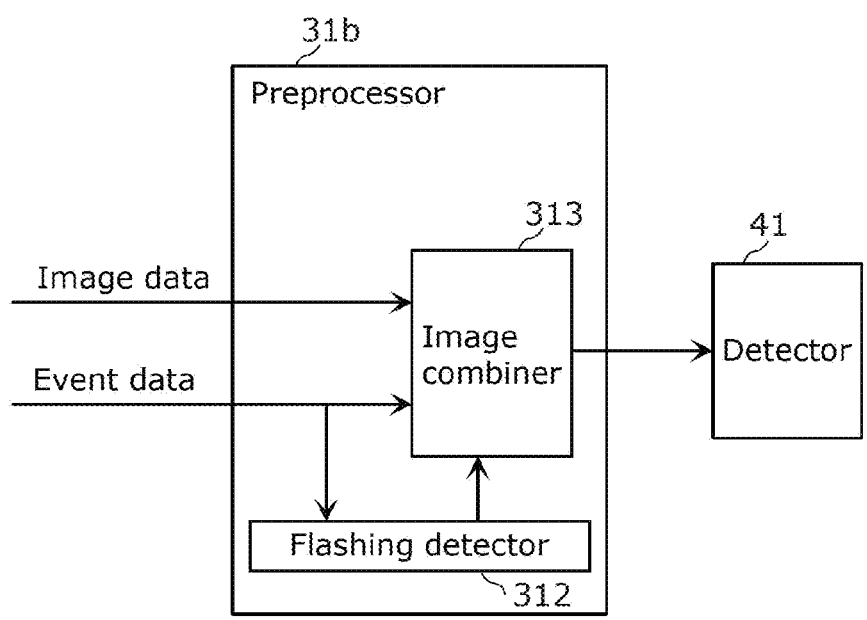
FIG. 17 is a block diagram illustrating another example of the configuration of a preprocessor according to Variation 1 of Embodiment 1.

FIG. 17 is a block diagram illustrating another example of the configuration of the preprocessor according to Variation 1 of the present embodiment.

For example, preprocessor 31b according to the present variation includes flashing detector 312 and image combiner 313, but does not include black-white detector 311, as illustrated in FIG. 17. Detection system 1 including preprocessor 31b just described combines a region in a frame in which an event has occurred with an ON image, similar to the example illustrated in FIG. 7. Note that said region is a region in the frame that corresponds to the event region indicated by event sensor 12.

Detection system 1 according to the present variation just described can produce advantageous effects that are substantially the same as some of the advantageous effects obtained by detection system 1 according to Embodiment 1.

Variation 2 of Embodiment 1

In Embodiment 1, flashing detector 312 of preprocessor 31 outputs the event region information to image combiner 313. Flashing detector 312 according to the present variation outputs the event region information to detector 41.

Figure 18:
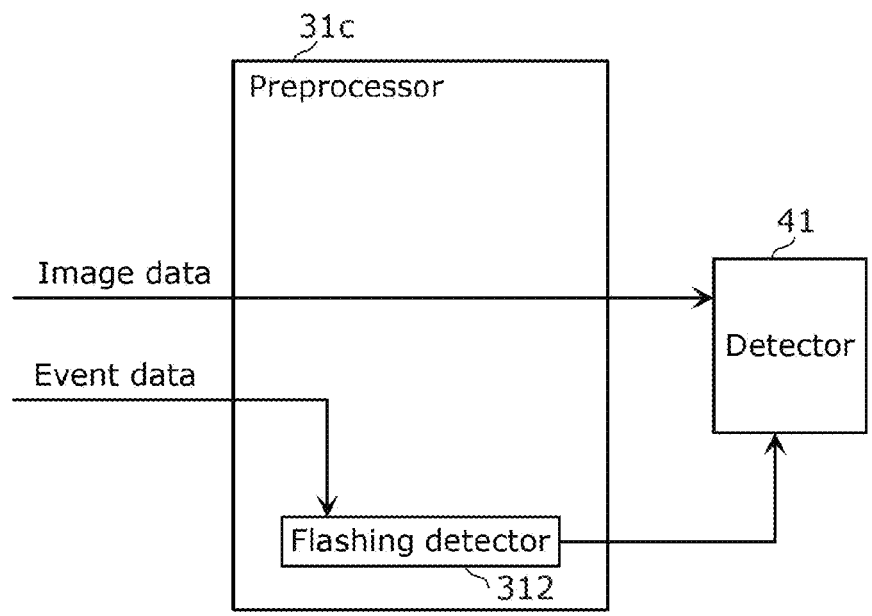
FIG. 18 is a block diagram illustrating one example of the configuration of a preprocessor according to Variation 2 of Embodiment 1.

FIG. 18 is a block diagram illustrating one example of the configuration of the preprocessor according to Variation 2 of the present embodiment.

For example, preprocessor 31c according to the present variation includes flashing detector 312, but does not include black-white detector 311 or image combiner 313, as illustrated in FIG. 18. In preprocessor 31c just described, flashing detector 312 outputs the event region information to detector 41, and the frames included in the image data are not subject to the combining.

Figure 19:
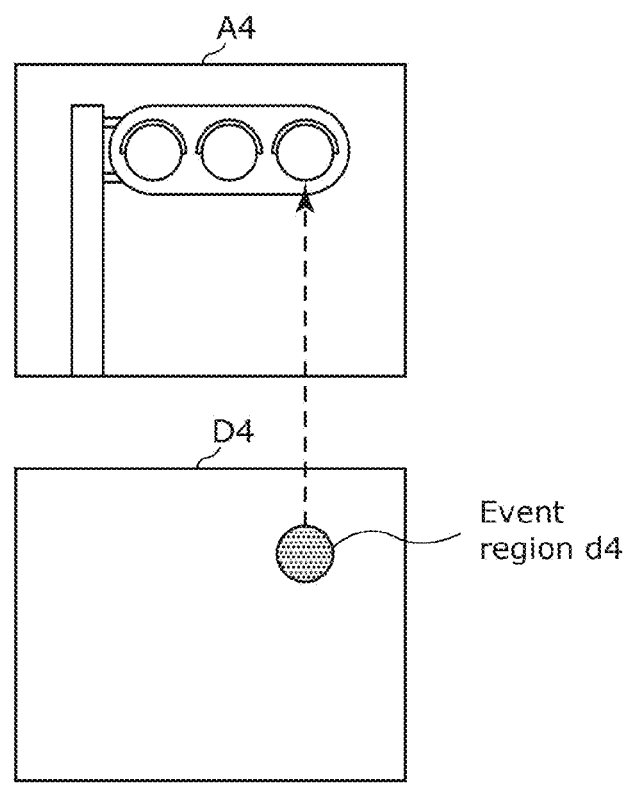
FIG. 19 is a diagram for describing the processing operation of a detector according to Variation 2 of Embodiment 1.

FIG. 19 is a diagram for describing the processing operation of detector 41 according to Variation 2 of the present embodiment.

Detector 41 obtains frame A4 included in the image data from image sensor 11 via preprocessor 31c, and obtains event region information D4 corresponding to frame A4 from flashing detector 312 of preprocessor 31. Note that in FIG. 19, a visualized version of event region information D4 is illustrated. Detector 41 specifies a region in frame A4 that corresponds to event region d4 indicated in event region information D4. Subsequently, detector 41 determines that the detection target appearing in the specified region in frame 4 is flashing fast. For example, when the specified region in frame A4 is a red light region, detector 41 determines that the detection target, that is, the red lamp, is ON and the red light is displayed.

Specifically, detector 41 detects a traffic light region from frame A4 and further detects a red light region from the traffic light region. Note that the traffic light region includes three light regions in which the blue lamp, the yellow lamp, and the red lamp appear. For example, in Japan, the red lamp of a horizontal traffic light is located to the right of the other lamps. In other words, three lamps, i.e., the blue lamp, the yellow lamp, and the red lamp, are arranged in the stated order from the left. Therefore, in the case where vehicle V equipped with detection system 1 is traveling on a road in Japan, detector 41 determines that among the three light regions included in the traffic light region, the rightmost light region is a red light region. Note that in the United States of America, the red lamp is located to the left of the other lamps. In other words, three lamps, i.e., the red lamp, the yellow lamp, and the blue lamp, are arranged in the stated order from the left. Therefore, in the case where vehicle V equipped with detection system 1 is traveling on a road in the United States of America, detector 41 determines that among the three light regions included in the traffic light region, the leftmost light region is a red light region. Subsequently, when the specified region in frame A4, that is, a region in which the fast-flashing detection target appears, overlaps the red light region, detector 41 determines that the red light is displayed. On the other hand, when the region in which the fast-flashing detection target appears does not overlap the red light region, detector 41 performs a normal image recognition process on frame A1 to determine whether the red light is displayed.

In this manner, detector 41 according to the present variation detects the state of the detection target using the image data and the event region information. In other words, detector 41 determines that the second processing target region in the image data, that is, the second processing target region corresponding to the region indicated in the auxiliary information such as event region information D4, is flashing. Subsequently, detector 41 detects the detection target or the state of the detection target on the basis of the result of the determination and the image data. With this, even when the image data is not combined with the ON image, erroneous detection of the detection target such as the red lamp, for example, can be minimized, as in the above-described case, on the basis of the auxiliary information and the image data.

Note that the traffic light is horizontal in the example illustrated in FIG. 19, but may be vertical. In Japan, three lamps included in the vertical traffic light, i.e., the red lamp, the yellow lamp, and the blue lamp, are arranged in the stated order from the top. Even when the traffic light is vertical, detector 41 specifies a red light region on the basis of this order in the arrangement. Furthermore, in the case where each event pixel included in event sensor 12 is sensitive to red light, detector 41 can determine, from event region information D4, whether the red light is displayed, without detecting a red light region.

Figure 20:
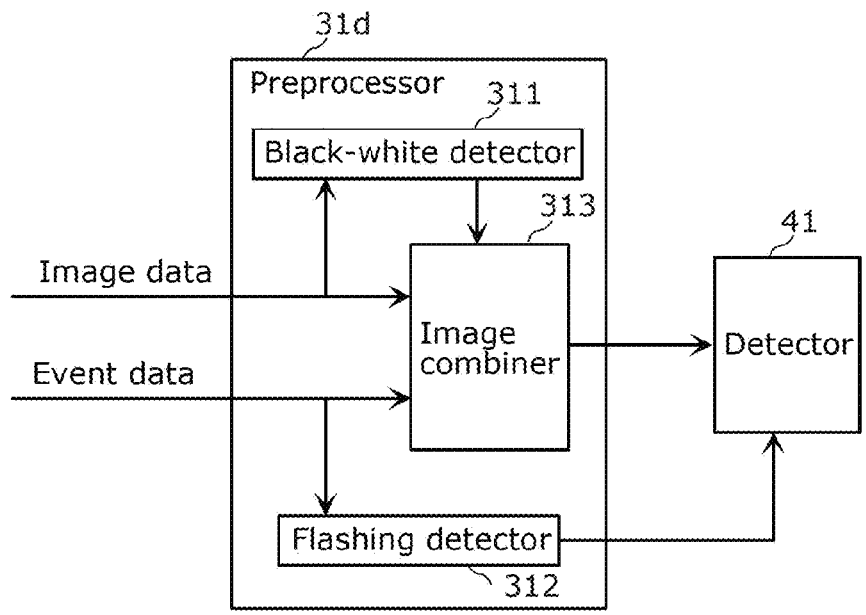
FIG. 20 is a block diagram illustrating another example of the configuration of a preprocessor according to Variation 2 of Embodiment 1.

FIG. 20 is a block diagram illustrating another example of the configuration of the preprocessor according to Variation 2 of the present embodiment.

For example, preprocessor 31d according to the present variation includes black-white detector 311, flashing detector 312, and image combiner 313, as illustrated in FIG. 20. Here, flashing detector 312 outputs the event region information to detector 41 instead of outputting the event region information to image combiner 313. In such a case, detector 41 detects a state of the detection target on the basis of the composite image and the event region indicated in the event region information, similar to the example illustrated in FIG. 19. Furthermore, on the basis of the event image such as the outline applied to the composite image, detector 41 detects the contour of the detection target appearing in each of the blown-out highlight and crushed shadow regions in that frame.

In this manner, in the example illustrated in FIG. 20, detector 41 determines that the second processing target region in the image data, that is, the second processing target region corresponding to the region indicated in the first auxiliary information such as event region information D4, is flashing, as in the example illustrated in FIG. 18. Subsequently, detector 41 detects the detection target or the state of the detection target on the basis of the result of the determination and the image data. Therefore, in the example illustrated in FIG. 20, even when the image data is not combined with the ON image, erroneous detection of the detection target such as the red lamp, for example, can be minimized on the basis of the first auxiliary information and the image data, as in the examples illustrated in FIG. 18 and FIG. 19.

Figure 21:
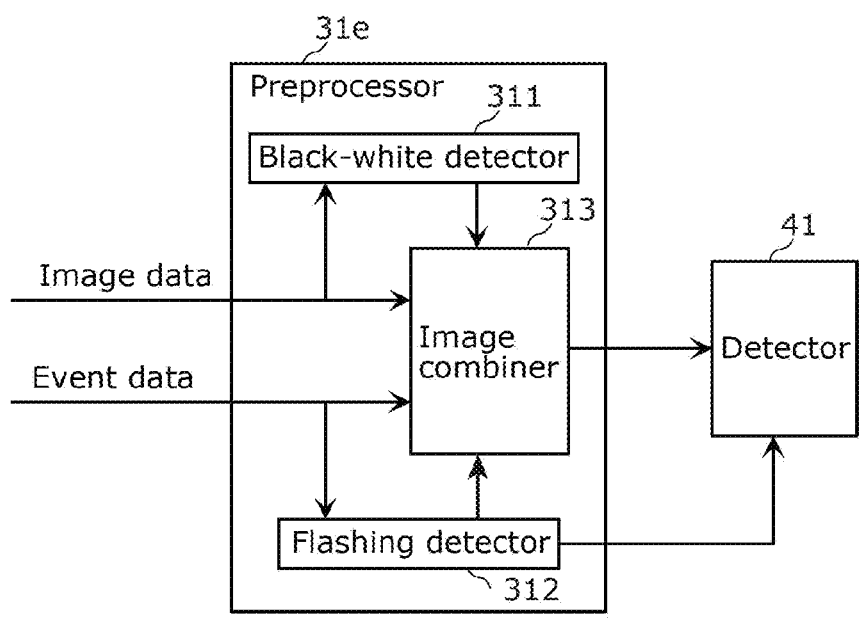
FIG. 21 is a block diagram illustrating yet another example of the configuration of a preprocessor according to Variation 2 of Embodiment 1.

FIG. 21 is a block diagram illustrating yet another example of the configuration of the preprocessor according to Variation 2 of the present embodiment.

For example, preprocessor 31e according to the present variation includes black-white detector 311, flashing detector 312, and image combiner 313, as illustrated in FIG. 21. Here, flashing detector 312 outputs the event region information to image combiner 313 and further outputs the event region information to detector 41. In such a case, detector 41 detects the detection target or the state of the detection target on the basis of the composite image obtained by combining the event image and the ON image, as in Embodiment 1 described above. Furthermore, by further using the event region indicated in the event region information, detector 41 can more accurately detect the state of the detection target.

Embodiment 2

Detection system 1 according to the present embodiment forms frames of the event data, unlike Embodiment 1. Furthermore, detection system 1 according to the present embodiment may perform processes substantially the same as the processes performed by detection system 1 according to Embodiment 1, except for the processes related to the frame formation of the event data. Note that among the structural elements in the present embodiment, structural elements that are the same as those in Embodiment 1 will be assigned the same reference signs as those given in Embodiment 1, and detailed description thereof will be omitted.

Figure 22:
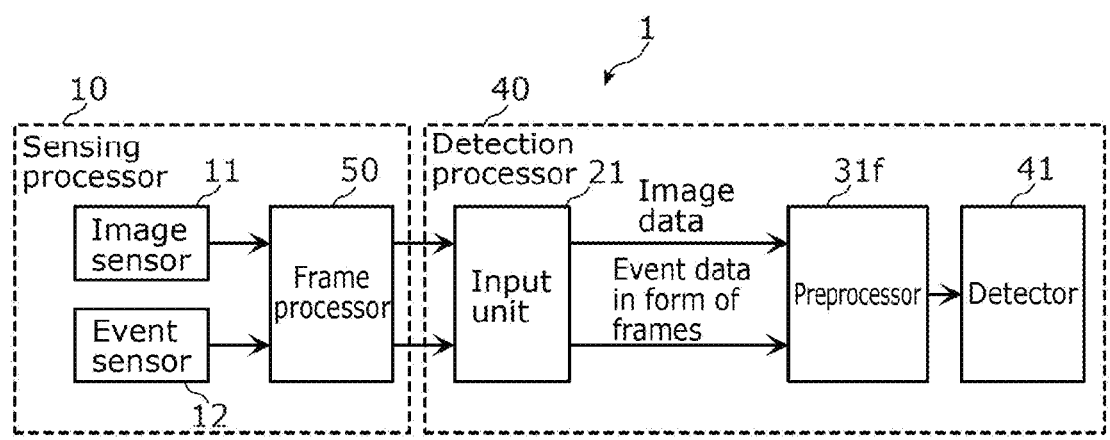
FIG. 22 is a block diagram illustrating one example of the specific configuration of a detection system according to Embodiment 2.

FIG. 22 is a block diagram illustrating one example of the specific configuration of detection system 1 according to the present embodiment.

Detection system 1 according to the present embodiment includes sensing processor 10 and detection processor 40. Sensing processor 10 according to the present embodiment includes not only image sensor 11 and event sensor 12, but also frame processor 50. Frame processor 50 obtains the image data from image sensor 11 and obtains the event data from event sensor 12. In other words, frame processor 50 according to the present embodiment includes the functions of obtainer 20 illustrated in FIG. 2. Furthermore, frame processor 50 forms frames of the event data obtained from event sensor 12 and outputs the event data in the form of frames periodically generated by the frame formation. It can be said that this event data in the form of frames is one type of the auxiliary information described above. Furthermore, frame processor 50 outputs, to input unit 21 of detection processor 40, the image data obtained from image sensor 11.

Detection processor 40 handles the event data in the form of frames in place of the event data. Such detection processor 40 includes preprocessor 31f in place of preprocessor 31 according to Embodiment 1. Input unit 21 obtains the event data in the forms of frames from frame processor 50 and outputs the event data in the forms of frames to preprocessor 31f. Preprocessor 31f performs a process using the event data in the form of frames and outputs the result of the process to detector 41.

Figure 23:
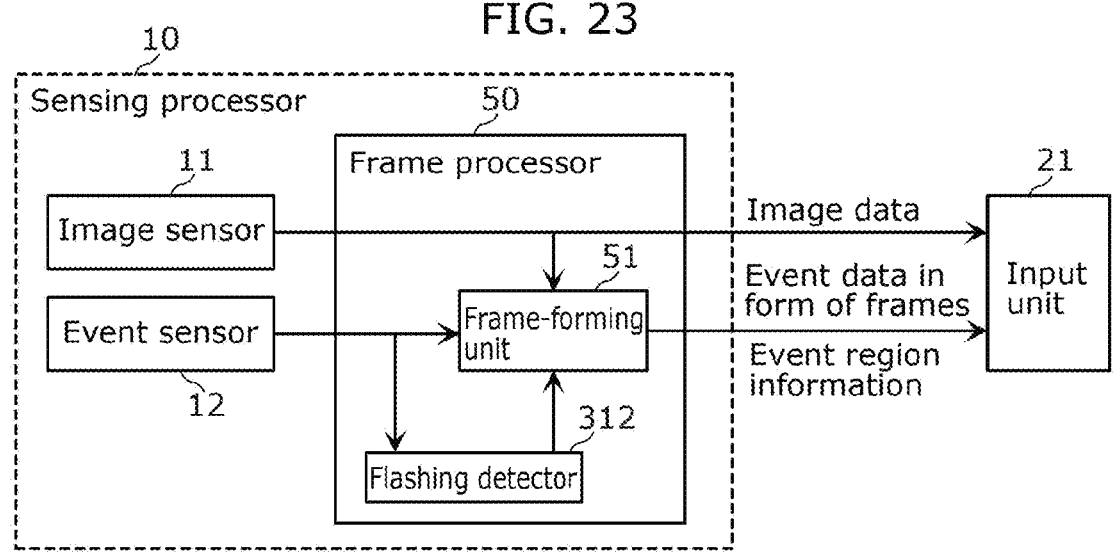
FIG. 23 is a block diagram illustrating one example of the detailed configuration of a frame processor according to Embodiment 2.

FIG. 23 is a block diagram illustrating one example of the detailed configuration of frame processor 50 according to the present embodiment.

Frame processor 50 includes frame-forming unit 51 and flashing detector 312. Flashing detector 312 extracts, from the event data, event region information indicating fast flashing, and outputs the event region information to frame-forming unit 51.

Frame-forming unit 51 obtains the event data from event sensor 12 and forms frames of the event data. Specifically, frame-forming unit 51 obtains the image data from image sensor 11 and forms frames of the event data by synchronizing the event data with frames included in that image data. In other words, frame-forming unit 51 temporally divides the event data on a predetermined period basis in synchronization with the frame period of the image data, for example. Subsequently, frame-forming unit 51 generates the event data in the form of frames by mapping an event that has occurred in said predetermined period onto the image region corresponding to the sensing region. Therefore, the event region information indicating fast flashing cannot be extracted from this event data in the form of frames. Thus, frame-forming unit 51 obtains the event region information output from flashing detector 312 and adds the event region information to the event data in the form of frames. In other words, to each of the frames included in the event data in the form of frames, the event region information corresponding to that frame is added. Therefore, it can be said that the event region information is also formed into frames in the present embodiment. Note that the coordinate data included in the event data, which indicates the position of an event, has been deleted in the event data in the form of frames.

Note that since frame processor 50 according to the present embodiment includes flashing detector 312, it can also be said that as a substitute for preprocessor 31 according to Embodiment 1, frame processor 50 according to the present embodiment includes some of the functions included in preprocessor 31.

Figure 24:
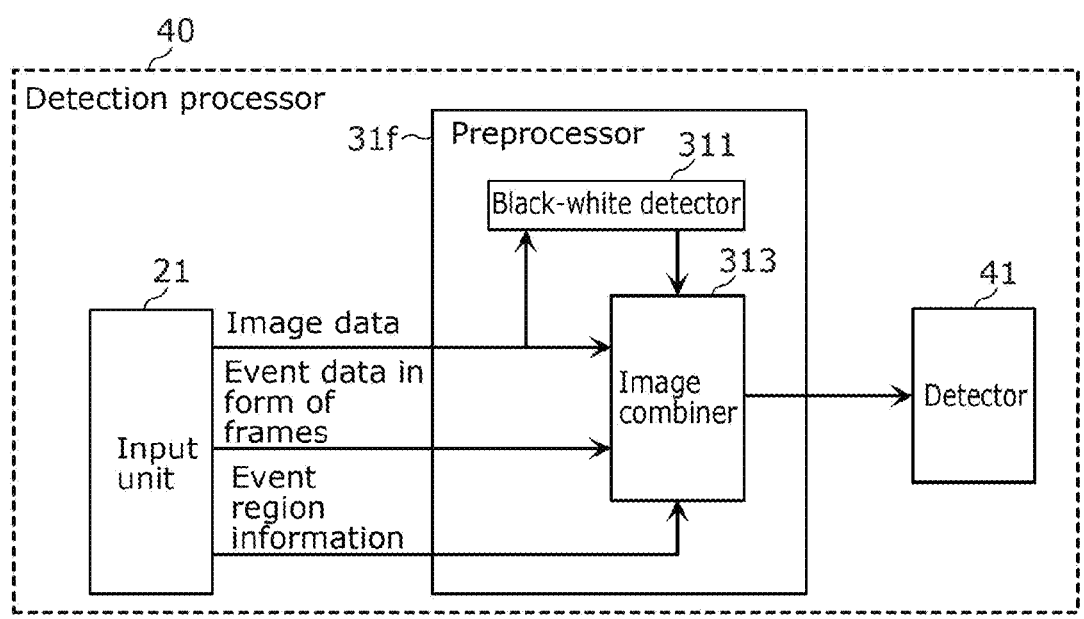
FIG. 24 is a block diagram illustrating one example of the detailed configuration of a preprocessor according to Embodiment 2.

FIG. 24 is a block diagram illustrating one example of the detailed configuration of preprocessor 31f according to the present embodiment.

Preprocessor 31f does not include flashing detector 312, but includes black-white detector 311 and image combiner 313. Image combiner 313 obtains the event data in the form of frames, in place of the event data, from input unit 21. Therefore, image combiner 313 can easily obtain, from the event data in the form of frames, the event image such as an outline that appears in that event data in the form of frames, and combine a frame of the image data with the event image.

As described above, detection system 1 according to the present embodiment includes frame-forming unit 51. Frame-forming unit 51 converts the obtained event data into event data in the form of frames that does not include the coordinate data, but represents images. Detector 41 detects a detection target or a state of the detection target on the basis of the image data, the auxiliary information, and the event data in the form of frames. Furthermore, frame-forming unit 51 according to the present embodiment adds the auxiliary information such as the event region information to the event data in the form of frames and outputs the event data in the form of frames. Furthermore, frame-forming unit 51 according to the present embodiment converts the event data so that the event data in the form of frames is synchronized with the image data.

For example, in the image data, the number of pixels in one frame is 1080×1920, the number of bits per pixel is 10 bits, and the frame rate is 30 fps. In this case, the bit rate (1) of the image data is calculated by 1080×1920×10×30 and determined as approximately 622 Mbits/sec.

Meanwhile, in the event data, for example, the number of event pixels that output that event data is 1080×1920, the numbers of bits used to indicate the coordinate data of one event pixel, specifically, the numbers of bits used to indicate the x-coordinate value and the y-coordinate value, are 12 bits and 11 bits. The number of bits used to indicate the polarity of one event is one bit. As a result, when the event occurrence rate is 30%, the bit rate (2) of the event data is calculated by 1080×1920×(12+11+1)×30×0.3 and determined as approximately 448 Mbits/sec. When the event occurrence rate is 42%, the bit rate (3) of the event data is calculated by 1080×1920×(12+11+1)×30×0.42 and determined as approximately 627 Mbits/sec. Furthermore, when a 10-bit time stamp is added to the event data, the bit rate of the event data further increases. Specifically, when the event occurrence rate is 30%, the bit rate (4) of the event data is calculated by 1080×1920×(12+11+1+10)×30×0.3 and determined as approximately 635 Mbits/sec. Note that the event occurrence rate is a ratio of the number of events that occur in one frame period (approximately 16.7 cosecs) to the pixel size (1080×1920).

In the case of the above-described example, the bit rates (3) and (4) of the event data are approximately equal to the bit rate (1) of the image data. In the case where detection system 1 is installed on vehicle V, it is quite possible that the event occurrence rate will become 42% or more when vehicle V turns left or right, for example. In other words, it is quite possible that the bit rate of the event data will become higher than the bit rates (3) and (4).

However, in the present embodiment, since the event data is converted into the event data in the form of frames, the bit rate thereof can be reduced. In the event data in the form of frames, the number of pixels in one frame is 1080×1920, and the frame rate is 30 fps, for example. One pixel includes one bit indicating whether an event has occurred and one bit indicating the polarity of the event. Furthermore, when the event region information is added to the event data in the form of frames, one pixel of the event data in the form of frames further uses one bit to indicate fast flashing. This means that in this case, one pixel is represented with three bits. As a result, regardless of the event occurrence rate, the bit rate (5) of the event data in the form of frames is calculated by 1080×1920×3×30 and determined as approximately 187 Mbits/sec. Note that one pixel of the event data in the form of frames may be represented with five bits. In this case, for example, one pixel is represented with two bits indicating the number of occurrences of plus events, two bits indicating the number of occurrences of minus events, and one bit indicating fast flashing. Note that the two bits can indicate zero to three occurrences of plus events. Similarly, the two bits can indicate zero to three occurrences of minus events.

In this manner, in the present embodiment, the event data is converted into the event data in the form of frames, and thus the amount of data to be used to detect the detection target can be significantly reduced. Furthermore, even when high-frequency flashing of the detection target is difficult to detect with the event data in the form of frames alone, the event data in the form of frames has added thereto the auxiliary information such as the event region information that indicates this flashing. This auxiliary information (specifically, the event region information) is extracted from the event data before the frames of the event data are formed. Therefore, by using the auxiliary information, it is possible to properly detect that the detection target is flashing, for example, that the red light is displayed when the detection target is the red lamp of a traffic light. Furthermore, since the event data in the form of frames is synchronized with the image data, the correspondence relationship between a frame included in the event data in the form of frames and a frame included in the image data can be clarified. Therefore, image combiner 313 can properly combine a frame of the image data with the event image included in a frame of the event data in the form of frames. As a result, the detection target appearing in the frame of the image data can be properly detected on the basis of the event image combined with that frame.

Variation of Embodiment 2

In Embodiment 2, image combiner 313 obtains the event region information and combines a region in a frame that corresponds to the event region indicated in the event region information (that is, the second processing target region) with an ON image. In Variation 1 of Embodiment 2, image combiner 313 neither obtains the event region information nor combines an ON image, similar to Variation 2 of Embodiment 1.

Detection system 1 according to the variation of Embodiment 2 includes sensing processor 10 and detection processor 40, similar to Embodiment 2. Furthermore, sensing processor 10 according to the present variation has the configuration illustrated in FIG. 23. On the other hand, in the present variation, preprocessor 31f included in detection processor 40 has a configuration different from the configuration of preprocessor 31f illustrated in FIG. 24.

Figure 25:
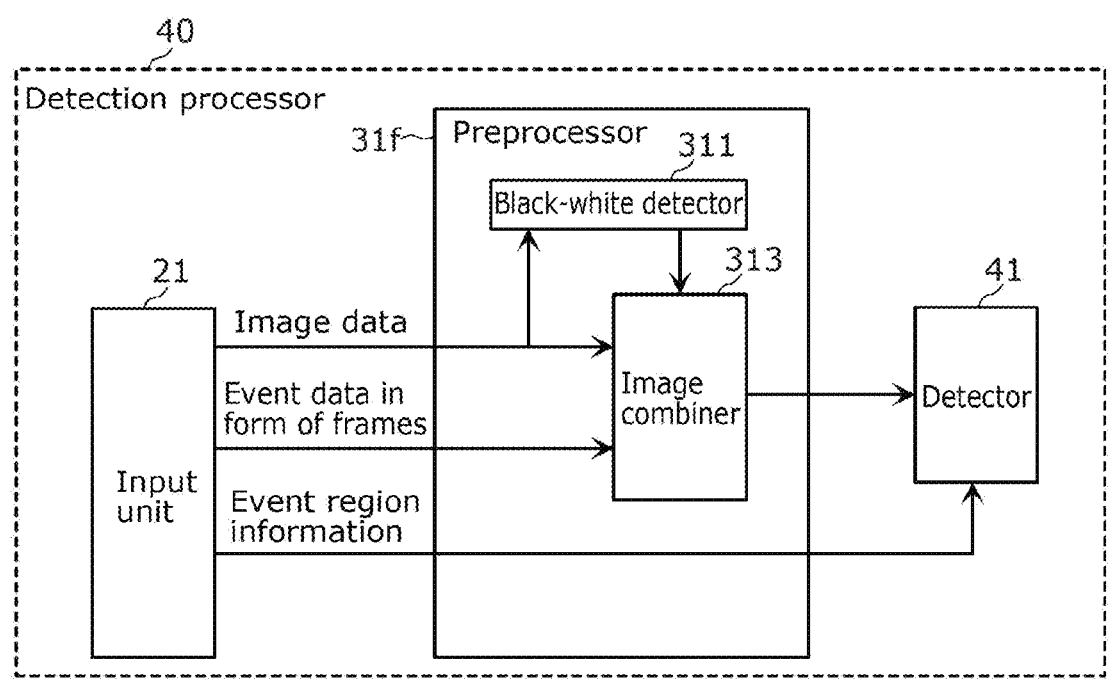
FIG. 25 is a block diagram illustrating one example of the detailed configuration of a preprocessor according to a variation of Embodiment 2.

FIG. 25 is a block diagram illustrating one example of the detailed configuration of preprocessor 31f according to the variation of the present embodiment.

When preprocessor 31f according to the present variation obtains the event region information output from input unit 21, preprocessor 31f outputs the event region information to detector 41. Therefore, image combiner 313 does not obtain the event region information and does not combine an ON image, as mentioned above. Detector 41 according to the present variation obtains the composite image output from image combiner 313 and obtains the event region information output from input unit 21 via preprocessor 31f. Similar to the example illustrated in FIG. 20, detector 41 detects the state of the detection target on the basis of the composite image and the event region indicated in the event region information. Furthermore, on the basis of the event image such as the outline applied to the composite image, detector 41 detects the contour of the detection target in each of the blown-out highlight and crushed shadow regions in that frame.

Figure 26:
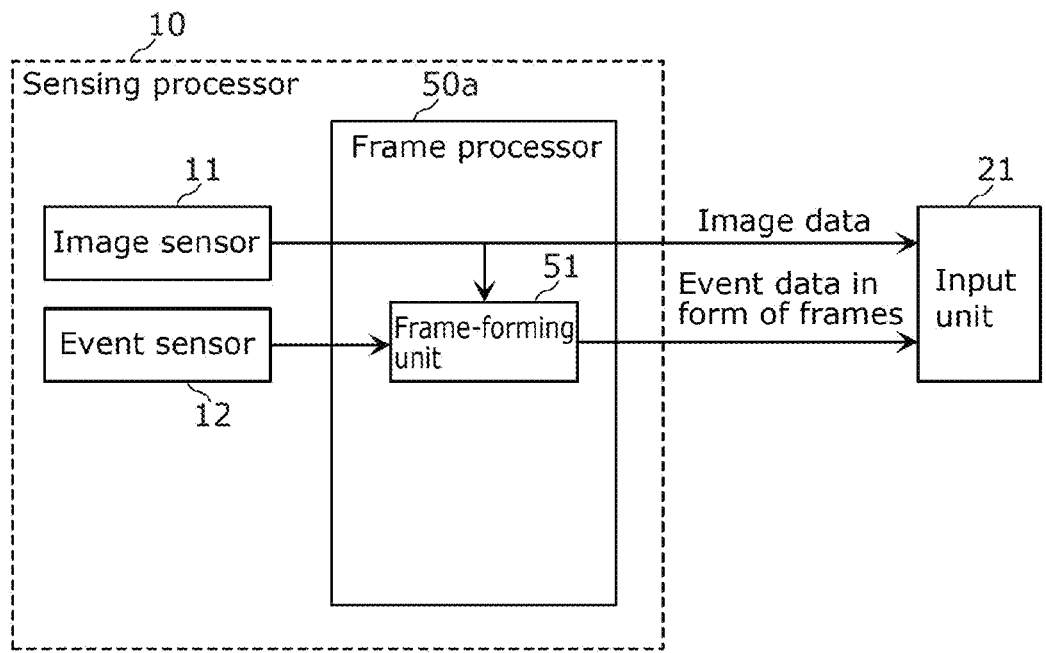
FIG. 26 is a block diagram illustrating another example of the detailed configuration of a frame processor according to a variation of Embodiment 2.
Figure 27:
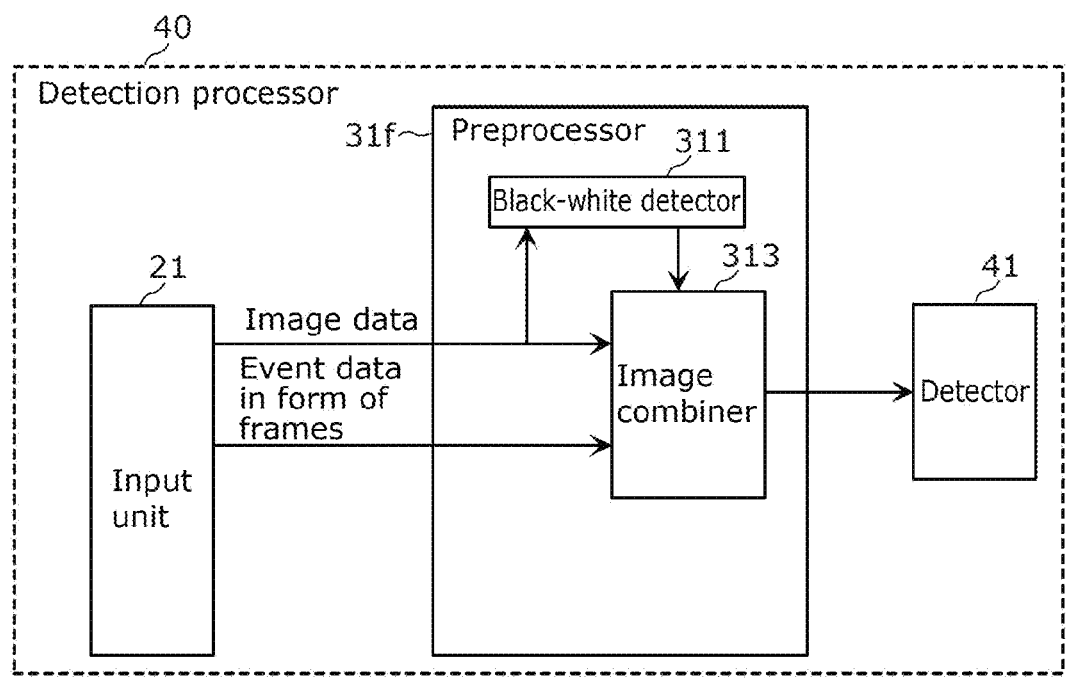
FIG. 27 is a block diagram illustrating another example of the detailed configuration of a preprocessor according to a variation of Embodiment 2.

FIG. 26 is a block diagram illustrating another example of the detailed configuration of the frame processor according to the variation of the present embodiment. FIG. 27 is a block diagram illustrating another example of the detailed configuration of preprocessor 31*f* according to the variation of the present embodiment.

Frame processor 50*a* according to the present variation includes frame-forming unit 51, but does not include flashing detector 312, as illustrated in FIG. 26. In this case, preprocessor 31*f* includes black-white detector 311 and image combiner 313, as illustrated in FIG. 27. Image combiner 313 does not obtain the event region information from frame processor 50*a* via input unit 21 and generates a composite image by combining a blown-out highlight region or a crushed shadow region in a frame of the image data with the event image such as an outline. The combining of an ON image on the basis of the event region information has not been applied to this composite image. Subsequently, image combiner 313 outputs this composite image to detector 41.

Figure 28:
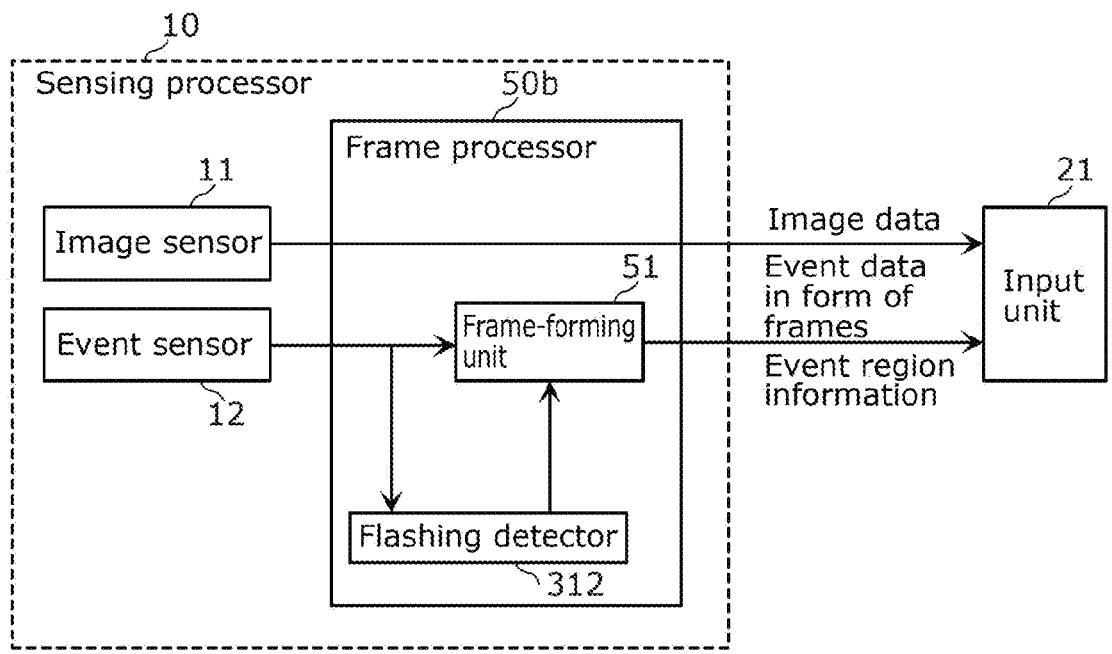
FIG. 28 is a block diagram illustrating yet another example of the detailed configuration of a frame processor according to a variation of Embodiment 2.
Figure 29:
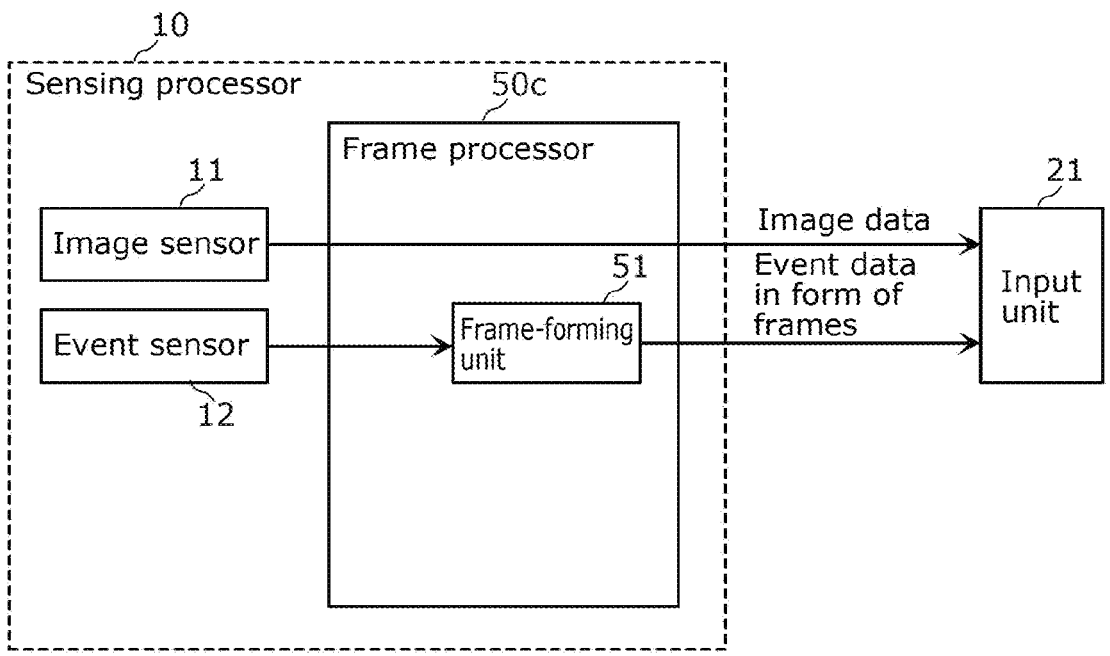
FIG. 29 is a block diagram illustrating yet another example of the detailed configuration of a frame processor according to a variation of Embodiment 2.

FIG. 28 and FIG. 29 are block diagrams each illustrating yet another example of the detailed configuration of the frame processor according to the variation of the present embodiment.

As illustrated in FIG. 28, frame processor 50*b* according to the present variation includes frame-forming unit 51; this frame-forming unit 51 forms frames of the event data without synchronizing the event data with the frames of the image data, unlike frame-forming unit 51 illustrated in FIG. 23. For example, frame-forming unit 51 may form frames of the event data with a period shorter than the frame period or may form frames of the event data with a period longer than the frame period. Furthermore, frame processor 50*c* according to the present variation does not need to include flashing detector 312, as illustrated in FIG. 29. Frame-forming unit 51 included in frame processor 50*c* just described forms frames of the event data without synchronizing the event data with the frames of the image data, similar to the example illustrated in FIG. 28.

Even in this variation, it is possible to produce advantageous effects that are the same as some of the advantageous effects obtained in Embodiment 2, specifically, the advantageous effects obtained by forming frames of the event data.

Embodiment 3

In Embodiments 1 and 2, sensing processor 10 includes image sensor 11 and event sensor 12 configured independently of each other. In Embodiment 3, image sensor 11 and event sensor 12 are integrally formed. Furthermore, except for the configuration in which these two sensors are integrally formed, detection system 1 according to Embodiment 3 may have a configuration substantially the same as the configuration of any one of detection systems 1 according to Embodiments 1 and 2 and the variations thereof. Note that among the structural elements in the present embodiment, structural elements that are the same as those in Embodiment 1 or 2 will be assigned the same reference signs as those given in Embodiment 1, and detailed description thereof will be omitted.

Figure 30:
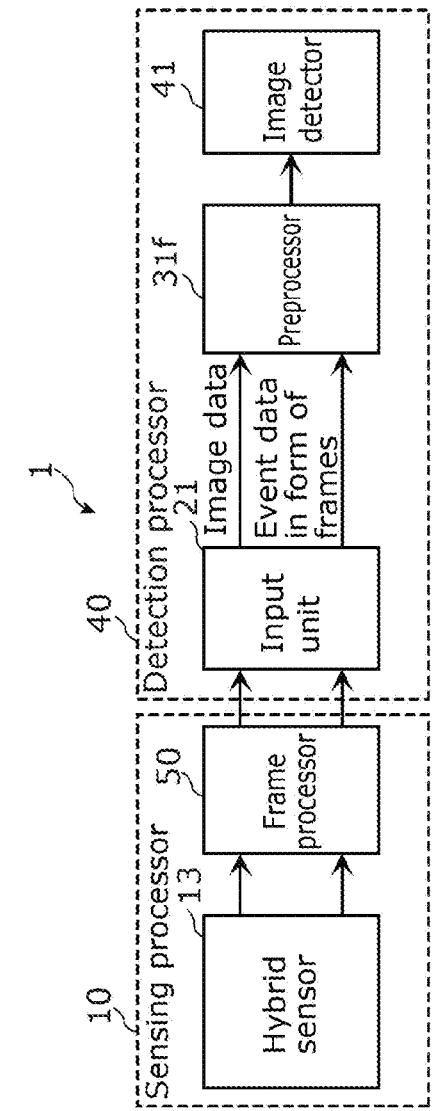
FIG. 30 is a block diagram illustrating one example of the specific configuration of a detection system according to Embodiment 3.

FIG. 30 is a block diagram illustrating one example of the specific configuration of detection system 1 according to the present embodiment.

Detection system 1 includes sensing processor 10 and detection processor 40. Detection processor 40 has performs the same processes with the same configuration as detection processor 40 according to Embodiment 2 or the variation thereof described above. Sensing processor 10 includes hybrid sensor 13 and frame processor 50. Frame processor 50 performs the same processes with the same configuration as frame processor 50 according to Embodiment 2. Furthermore, in the present embodiment, frame processor 50*a*, 50*b*, or 50*c* according to the variation of Embodiment 2 may be used in place of frame processor 50.

Hybrid sensor 13 is formed by integrating image sensor 11 and event sensor 12. Specifically, hybrid sensor 13 includes the plurality of imaging pixels of image sensor 11 and the plurality of event pixels of event sensor 12.

Figure 31:
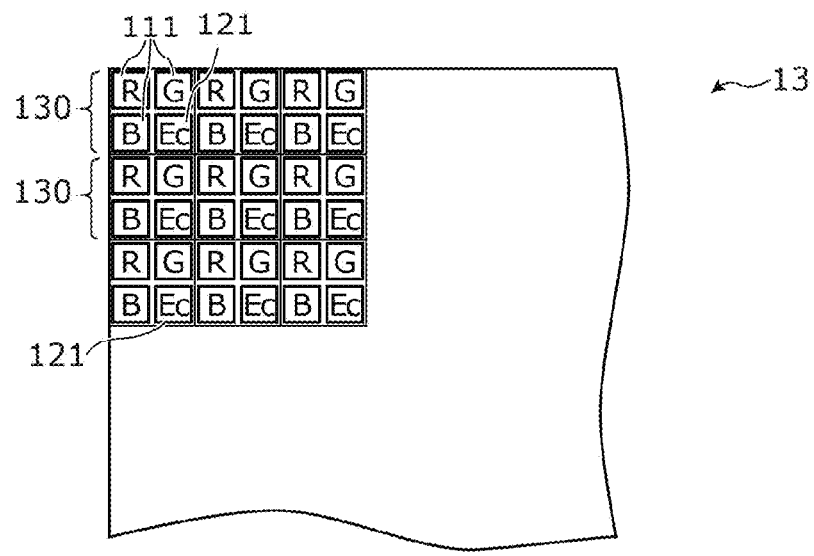
FIG. 31 is a diagram illustrating one example of the configuration of a hybrid sensor according to Embodiment 3.

FIG. 31 is a diagram illustrating one example of the configuration of hybrid sensor 13.

Hybrid sensor 13 includes a plurality of pixel units 130 arranged in a matrix, as illustrated in FIG. 31. Each of the plurality of pixel units 130 includes three imaging pixels 111 and one event pixel 121. Three imaging pixels 111 include imaging pixel 111 that is sensitive to red light, imaging pixel 111 that is sensitive to green light, and imaging pixel 111 that is sensitive to blue light. Event pixel 121 is sensitive to each of red light, green light, and blue light. In other words, it can be said that event pixel 121 is sensitive to clear light.

In hybrid sensor 13 just described, the image data and the event data are associated with each other for each pixel unit 130. Specifically, the region of a portion of a frame that is represented by the output from three imaging pixels 111 included in pixel unit 130 is associated with the event data that is output from event pixel 121 included in that pixel unit 130. In other words, in the present embodiment, the association between imaging pixel 111 and event pixel 121 is physically fixed, unlike the example illustrated in FIG. 14.

In hybrid sensor 13 just described, the ratio between the number of imaging pixels 111 and the number of event pixels 121 is 3:1. Therefore, the bit rate (6) of the image data that is output from hybrid sensor 13 is ¾ of the aforementioned bit rate (1); specifically, the bit rate (6) is calculated by 1080×1920×10×30×¾ and determined as approximately 467 Mbits/sec. Furthermore, the bit rate (7) of the event data in the form of frames based on the event data that is output from hybrid sensor 13 is ¼ of the aforementioned bit rate (5); specifically, the bit rate (7) is calculated by 1080×1920×3×30×¼ and determined as approximately 47 Mbits/sec. Note that the event region information has been added to the event data in the form of frames. Using hybrid sensor 13 just described, the bit rate can be significantly reduced.

Figure 32:
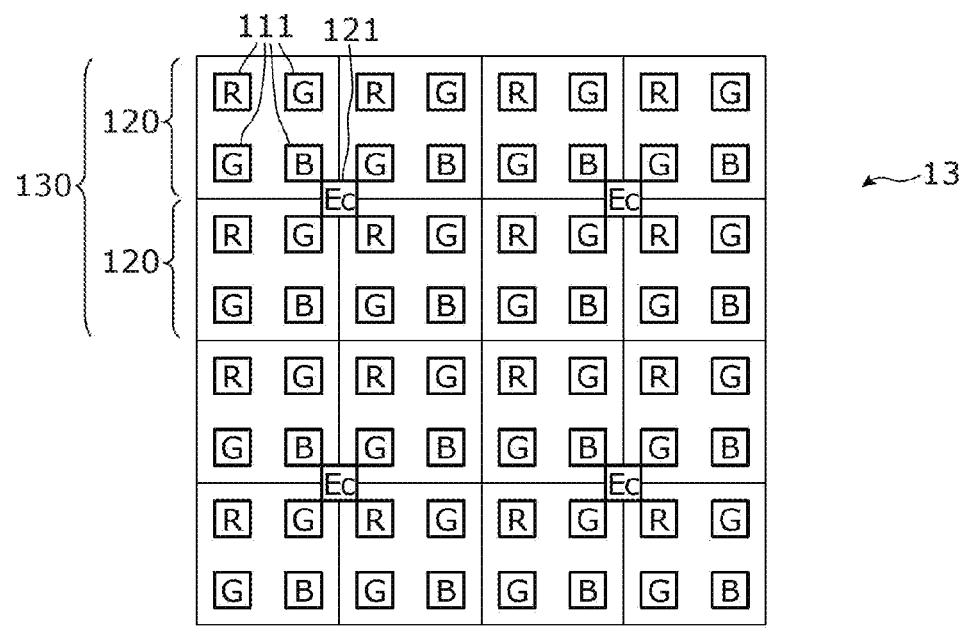
FIG. 32 is a diagram illustrating another example of the configuration of a hybrid sensor according to Embodiment 3.

FIG. 32 is a diagram illustrating another example of the configuration of hybrid sensor 13.

Hybrid sensor 13 includes a plurality of pixel units 130 arranged in a matrix, as illustrated in FIG. 32. Each of the plurality of imaging pixel units 130 includes four imaging pixel units 120 and one event pixel 121. Each of four imaging pixel units 120 includes four imaging pixels 111. Four imaging pixels 111 include imaging pixel 111 that is sensitive to red light, two imaging pixels 111 that are sensitive to green light, and imaging pixel 111 that is sensitive to blue light. The arrangement of these four imaging pixel units 120 is, for example, the Bayer pattern. Event pixel 121 is disposed at the center of these four imaging pixel units 120, for example.

In hybrid sensor 13 just described, the image data and the event data are associated with each other for each pixel unit 130, similar to the example illustrated in FIG. 31. Specifically, the region of a portion of a frame that is represented by the output from 16 imaging pixels 111 included in pixel unit 130 is associated with the event data that is output from event pixel 121 included in that pixel unit 130.

As described above, detection system 1 according to the present embodiment includes hybrid sensor 13 in which a plurality of first pixels that generate the image data and a plurality of second pixels that generate the event data are arranged. Note that the first pixels are imaging pixels 111 and the second pixels are event pixels 121. Thus, one hybrid sensor 13 includes: image sensor 11 that generates the image data; and event sensor 12 that generates the event data. As a result, the lens of image sensor 11 and the lens of event sensor 12 can be shared, and the correspondence relationship between the plurality of imaging pixels 111 of image sensor 11 and the plurality of event pixels 121 of event sensor 12 can be fixed in advance. Therefore, positioning for specifying the correspondence relationship can be omitted. In other words, it is possible to easily and accurately specify which region in the sensing region of event sensor 12 each region in a frame of the image data corresponds to. Thus, the detection target can be more accurately detected from the image data. Since hybrid sensor 13 is formed by integrating image sensor 11 and event sensor 12, it is not necessary to include a lens for image sensor 11 and a lens for event sensor 12, meaning that the device configuration can be simplified.

Furthermore, in the present embodiment, the plurality of imaging pixels 111 include a plurality of types of pixels that are sensitive to light of different colors. Examples of the different colors include red, green, and blue. Each of the plurality of event pixels 121 is sensitive to clear light. With this, the image data of an appropriate color can be obtained. Furthermore, since each of the plurality of event pixels 121 is sensitive to clear light, it is possible to obtain event data having a wide dynamic range. As a result, a detection target or a state of the detection target can be detected with high accuracy.

Here, the plurality of imaging pixels 111 may include a plurality of types of pixels that are sensitive to light of different colors, and each of the plurality of event pixels 121 may be sensitive to red light. With this, the event data is generated on the basis of a change in the amount of red light received; thus, it is possible to properly detect an event that occurs on a detection target such as the red lamp of a traffic light and a brake lamp of a vehicle, for example, and a state of the detection target can be detected with high accuracy.

Furthermore, the plurality of imaging pixels 111 may include: a pixel that is sensitive to red light; and a pixel that is sensitive to light of a color other than red. The plurality of event pixels 121 may include: a pixel that is sensitive to red light; and a pixel that is sensitive to clear light.

With this, event data having a wide dynamic range can be obtained and furthermore, it is possible to properly detect an event that occurs on a detection target such as the red lamp of a traffic light and a brake lamp of a vehicle. As a result, a detection target such as the red lamp or a state of the detection target can be detected with high accuracy.

Furthermore, the plurality of imaging pixels 111 may include: a pixel that is sensitive to red light; a pixel that is sensitive to yellow light; and a pixel that is sensitive to light of a color other than red and yellow. The plurality of event pixels 121 may include: a pixel that is sensitive to red light; a pixel that is sensitive to yellow light; and a pixel that is sensitive to clear light.

With this, event data having a wide dynamic range can be obtained. Furthermore, since the plurality of event pixels 121 include a pixel that is sensitive to red light, it is possible to properly detect an event that occurs on a detection target such as the red lamp of a traffic light and a brake lamp of a vehicle. Furthermore, since the plurality of event pixels 121 include a pixel that is sensitive to yellow light, it is possible to properly detect an event that occurs on a detection target such as the yellow lamp of a traffic light. As a result, a detection target such as the red lamp and the yellow lamp or a state of the detection target can be detected with high accuracy.

Furthermore, as is clear from the present embodiment, the plurality of event pixels 121 are fewer than the plurality of imaging pixels 111. Thus, in hybrid sensor 13, the plurality of event pixels 121 are arranged more sparsely than the plurality of imaging pixels 111. Therefore, when there is a need for high-resolution image data to detect a detection target, the number of event pixels 121 can be reduced to prevent an excessive increase in the definition of hybrid sensor 13.

Furthermore, the plurality of imaging pixels 111 may include a plurality of types of pixels having different dynamic ranges. With this, it is possible to obtain HDR image data, and a detection target or a state of the detection target can be detected with improved accuracy.

Variation of Embodiments 2 and 3

In the present variation, detection processor 40 does not include preprocessor 31.

Figure 33:
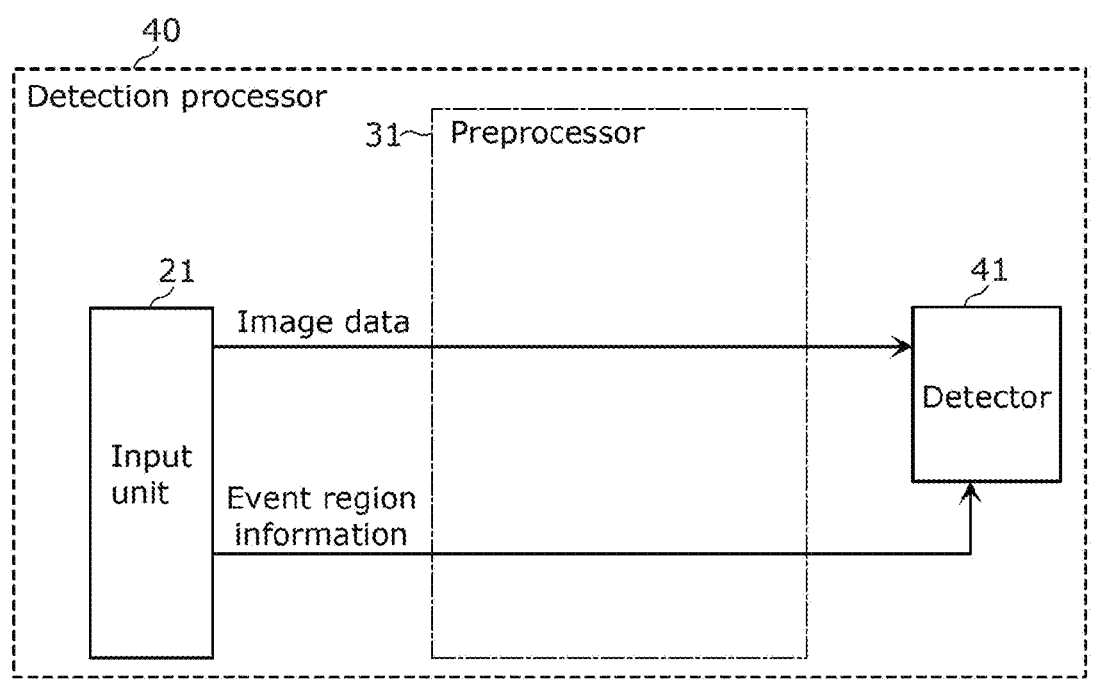
FIG. 33 is a diagram illustrating one example of the configuration of a detection processor according to a variation of Embodiments 2 and 3.

FIG. 33 is a diagram illustrating one example of the configuration of detection processor 40 according to the present variation.

Detection processor 40 includes input unit 21 and detector 41, but does not include preprocessor 31. In this case, the frame processor according to the present variation includes at least flashing detector 312, as with frame processor 50 illustrated in FIG. 23 or frame processor 50b illustrated in FIG. 28. Input unit 21 outputs, to detector 41, the image data and the event region information generated by flashing detector 312. Detector 41 obtains the image data and the event region information. As in the examples illustrated in FIG. 18 and FIG. 19, detector 41 detects the state of the detection target using the image data and the event region information. Even in the present variation, it is possible to produce advantageous effects that are the same as some of the advantageous effects obtained in Embodiment 2 or Embodiment 3.

Other Aspects, Etc.

The detection system, etc., according to one or more aspects of the present disclosure have been described thus far based on the embodiments and the variations, but the present disclosure is not limited to these embodiments and variations. Various modifications to the above embodiments or variations that can be conceived by those skilled in the art without departing from the teachings of the present disclosure may be included in the present disclosure. Furthermore, forms configured by combining structural elements in different embodiments and variations may also be included in the present disclosure.

Note that the following cases are also included in the present disclosure.

(1) At least one of the devices described above is specifically a computer system configured from a microprocessor, a read only memory (ROM), a random access memory (RAM), a hard disk unit, a display unit, a keyboard, and a mouse, for example. A computer program is stored in the RAM or the hard disk unit. At least one of the devices described above achieves its function as a result of the microprocessor operating according to the computer program. Here, the computer program is configured of a combination of command codes indicating commands to the computer in order to achieve a predetermined function.

(2) Some or all of the structural elements included in at least one of the devices described above may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) Some or all of the structural elements included in at least one of the devices described above may each be configured from an IC card that is detachably attached to the device or a stand-alone module. The IC card and the module are computer systems configured from a microprocessor, ROM, and RAM, for example. The IC card and the module may include the super-multifunction LSI described above. The IC card and the module achieve their functions as a result of the microprocessor operating according to the computer program. The IC card and the module may be tamperproof.

(4) The present disclosure may be the above-described methods. Furthermore, the present disclosure may be a computer program for implementing these methods using a computer or may be a digital signal of the computer program.

Furthermore, the present disclosure may be a computer program or a digital signal recorded on a computer-readable recording medium, such as a flexible disk, a hard disk, a compact disc read-only memory (CD-ROM), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in the present disclosure, the computer program or the digital signal may be transmitted via an electrical communication line, a wireless or wired communication line, a network represented by the Internet, data broadcasting, or the like.

Moreover, by transferring the recording medium having the program or the digital signal recorded thereon or by transferring the program or the digital signal via the network or the like, the present disclosure may be implemented by a different independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2022-092962 filed on Jun. 8, 2022.

INDUSTRIAL APPLICABILITY

The present disclosure can be applied to a system or the like that is installed on a vehicle, for example, and detects a detection target such as a traffic light located around the vehicle.

The invention claimed is:

1. A detection system comprising:
an obtainment circuit that, in operation, obtains image data and event data, the image data being generated based on an amount of light received by each of a plurality of pixels from a detection target, the event data being generated based on a change in an amount of light received by each of a plurality of pixels from the detection target;
a processing circuit that, in operation, extracts, from the event data as auxiliary information, information to be used to assist in detecting the detection target from the image data; and
a detection circuit that, in operation, detects the detection target or a state of the detection target based on at least the image data and the auxiliary information,
wherein the processing circuit includes:
a black-white detection circuit that, in operation, detects, as a first processing target region, a region in the image data in which a phenomenon that is a blown-out highlight or a crushed shadow has occurred; and
an image combining circuit that, in operation, generates a composite image by extracting, from the event data as first auxiliary information included in the auxiliary information, information indicating an event that has occurred at a position corresponding to the first processing target region at a time of occurrence of the phenomenon, and combining the first processing target region in the image data with an event image representing the event, and
wherein the detection circuit, in operation, detects the detection target or the state of the detection target based on the composite image.

2. The detection system according to claim 1, wherein when the blown-out highlight occurs as the phenomenon, the image combining circuit combines the first processing target region with the event image of a color different from a color of an image in the first processing target region or the event image at a luminance level lower than a luminance level of the image in the first processing target region, and
when the crushed shadow occurs as the phenomenon, the image combining circuit combines the first processing target region with the event image of a color different from a color of an image in the first processing target region or the event image at a luminance level higher than a luminance level of the image in the first processing target region.

3. The detection system according to claim 1, wherein when the image data is generated by global shutter imaging and includes a frame including the first processing target region,
the image combining circuit determines the time of the occurrence of the phenomenon according to a timing at which the frame is generated.

4. The detection system according to claim 1, wherein when the image data is generated by rolling shutter imaging and includes a frame including the first processing target region,
the image combining circuit determines the time of the occurrence of the phenomenon according to a timing at which, among a plurality of lines included in the frame, a line including at least a portion of the first processing target region is generated.

5. The detection system according to claim 1, wherein the processing circuit includes:
a flashing detection circuit that, in operation, detects, from the event data, a region in which a plus event and a minus event have repeatedly occurred at a frequency greater than or equal to a threshold value, and extracts, as second auxiliary information included in the auxiliary information, information indicating that the region is flashing, and the image combining circuit generates the composite image by further combining a second processing target region in the image data with an ON image indicating that the detection target is flashing, the second processing target region corresponding to the region indicated in the second auxiliary information.

6. The detection system according to claim 1, wherein the processing circuit includes:
  a flashing detection circuit that, in operation, detects, from the event data, a region in which a plus event and a minus event have repeatedly occurred at a frequency greater than or equal to a threshold value, and extracts, as second auxiliary information included in the auxiliary information, information indicating that the region is flashing, and
  the detection circuit, in operation, determines that a second processing target region in the image data is flashing, and detects the detection target or the state of the detection target based on a result of the determination and the composite image, the second processing target region corresponding to the region indicated in the second auxiliary information.

7. The detection system according to claim 1, further comprising:
  a frame-forming circuit that in operation, converts the event data obtained, into event data in a form of a frame that represents an image without including coordinate data, and
  the detection circuit, in operation, detects the detection target or the state of the detection target based on the image data, the auxiliary information, and the event data in the form of the frame.

8. The detection system according to claim 7, wherein the processing circuit includes a flashing detection circuit that, in operation, detects, from the event data, a region in which a plus event and a minus event have repeatedly occurred at a frequency greater than or equal to a threshold value, and extracts, as second auxiliary information included in the auxiliary information, information indicating that the region is flashing, and
  the frame-forming circuit adds the second auxiliary information to the event data in the form of the frame and outputs the event data in the form of the frame.

9. The detection system according to claim 7, wherein the frame-forming circuit, in operation, converts the event data so as to synchronize the event data in the form of the frame with the image data.

10. The detection system according to claim 1, further comprising:
  a sensor in which a plurality of first pixels and a plurality of second pixels are arranged, the plurality of first pixels being for generating the image data, the plurality of second pixels being for generating the event data.

11. The detection system according to claim 10, wherein the plurality of first pixels include a plurality of types of pixels that are sensitive to light of different colors, and each of the plurality of second pixels is sensitive to clear light.

12. The detection system according to claim 10, wherein the plurality of first pixels include a plurality of types of pixels that are sensitive to light of different colors, and each of the plurality of second pixels is sensitive to red light.

13. The detection system according to claim 10, wherein the plurality of first pixels include a pixel that is sensitive to red light and a pixel that is sensitive to light of a color other than red, and
  the plurality of second pixels include a pixel that is sensitive to red light and a pixel that is sensitive to clear light.

14. The detection system according to claim 10, wherein the plurality of first pixels include a pixel that is sensitive to red light, a pixel that is sensitive to yellow light, and a pixel that is sensitive to light of a color other than red and yellow, and
  the plurality of second pixels include a pixel that is sensitive to red light, a pixel that is sensitive to yellow light, and a pixel that is sensitive to clear light.

15. The detection system according to claim 10, wherein the plurality of second pixels are fewer than the plurality of first pixels.

16. The detection system according to claim 10, wherein the plurality of first pixels include a plurality of types of pixels each having a different dynamic range.

17. A detection method comprising:
  obtaining image data and event data, the image data being generated based on an amount of light received by each of a plurality of pixels from a detection target, the event data being generated based on a change in an amount of light received by each of a plurality of pixels from the detection target;
  detecting, as a first processing target region, a region in the image data in which a phenomenon that is a blown-out highlight or a crushed shadow has occurred;
  generating a composite image by extracting, from the event data as auxiliary information, information indicating an event that has occurred at a position corresponding to the first processing target region at a time of occurrence of the phenomenon, and combining the first processing target region in the image data with an event image representing the event; and
  detecting the detection target or a state of the detection target based on the composite image.

18. A detection system comprising:
  an obtainment circuit that, in operation, obtains image data and event data, the image data being generated based on an amount of light received by each of a plurality of pixels from a detection target, the event data being generated based on a change in an amount of light received by each of a plurality of pixels from the detection target;
  a processing circuit that, in operation, extracts, from the event data as auxiliary information, information to be used to assist in detecting the detection target from the image data; and
  a detection circuit that, in operation, detects the detection target or a state of the detection target based on at least the image data and the auxiliary information,
  wherein the processing circuit includes:
    a flashing detection circuit that, in operation, detects, from the event data, a region in which a plus event and a minus event have repeatedly occurred at a frequency greater than or equal to a threshold value, and extracts, as the auxiliary information, information indicating that the region is flashing; and
    an image combining circuit that, in operation, generates a composite image by combining a second processing target region in the image data with an ON image indicating that the detection target is flashing, the second processing target region corresponding to the region indicated in the auxiliary information, and wherein the detection circuit, in operation, detects the detection target or the state of the detection target based on the composite image.

* * * * *